US012349157B2

(12) United States Patent
Shrestha et al.

(10) Patent No.: US 12,349,157 B2
(45) Date of Patent: Jul. 1, 2025

(54) TRANSMISSION IN CONFIGURED GRANT AND SEMI-PERSISTENT SCHEDULING IN NON-TERRESTRIAL NETWORK

(71) Applicant: QUALCOMM Incorporated, San Diego, CA (US)

(72) Inventors: Bharat Shrestha, San Diego, CA (US); Umesh Phuyal, San Diego, CA (US); Liangping Ma, San Diego, CA (US); Xiao Feng Wang, San Diego, CA (US); Ayan Sengupta, San Diego, CA (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 476 days.

(21) Appl. No.: 17/805,104

(22) Filed: Jun. 2, 2022

(65) Prior Publication Data

US 2023/0132414 A1 May 4, 2023

Related U.S. Application Data

(60) Provisional application No. 63/263,408, filed on Nov. 2, 2021.

(51) Int. Cl.
*H04W 72/11* (2023.01)
*H04L 1/1812* (2023.01)
*H04W 72/23* (2023.01)

(52) U.S. Cl.
CPC ........... *H04W 72/23* (2023.01); *H04L 1/1812* (2013.01)

(58) Field of Classification Search
CPC ... H04W 72/23; H04W 72/21; H04W 72/115; H04L 1/1812; H04L 1/1851;
(Continued)

(56) References Cited

U.S. PATENT DOCUMENTS 12,143,226 B2 * 11/2024 Lee .................... H04L 1/1812
2020/0154469 A1   5/2020 Chin et al.
(Continued)

FOREIGN PATENT DOCUMENTS

WO    WO2018211364       * 11/2018  ............... H04L 1/18
WO    WO2021087903 A1  *  5/2021  ............... H04L 1/18

OTHER PUBLICATIONS

Lu Qianxi et al (Pub. No. WO 2021087903 A1), Title: "Wireless Communication Method and Device, Terminal Device, and Network Device"; May 14, 2021 (WO Document translated from Espacenet) (Year: 2021).*

(Continued)

*Primary Examiner* — Christopher M Crutchfield
*Assistant Examiner* — Syed Ahmed
(74) *Attorney, Agent, or Firm* — Harrity & Harrity, LLP

(57) ABSTRACT

Various aspects of the present disclosure generally relate to wireless communication. In some aspects, a user equipment (UE) may receive an indication to transmit a communication associated with a configured grant in a non-terrestrial network (NTN), the indication indicating a hybrid automatic repeat request (HARQ) process identifier and a configured grant index of the communication. The UE may perform a transmission of the communication based at least in part on the HARQ process identifier and the configured grant index. Numerous other aspects are described.

30 Claims, 14 Drawing Sheets

(58) Field of Classification Search
CPC ... H04L 1/1864; H04L 1/1883; H04L 1/1822; H04L 5/0053; H04L 5/0091
USPC ............................................. 370/329
See application file for complete search history.

(56) References Cited

U.S. PATENT DOCUMENTS

| | | | |
|---|---|---|---|
| 2020/0322980 | A1 | 10/2020 | Fakoorian et al. |
| 2021/0298052 | A1 | 9/2021 | Namba et al. |
| 2022/0061074 | A1* | 2/2022 | Babaei .................. H04L 5/0053 |
| 2024/0154775 | A1* | 5/2024 | Ying .................. H04L 5/0053 |
| 2024/0162976 | A1* | 5/2024 | Ye ...................... H04B 7/18563 |
| 2024/0214128 | A1* | 6/2024 | Wen ...................... H04L 1/1822 |
| 2024/0340112 | A1* | 10/2024 | Ying .................. H04W 72/232 |

OTHER PUBLICATIONS

MediaTeK Inc. (3GPP TSG-RAN WG2 Meeting #113bis-e, R2-2102823, Resubmission of R2-2100262, Online, Apr. 12-Apr. 20, 2021) Title: "Round Trip Delay Offset for Configured Grant Timers"; (Year: 2021).*
Vivo (3GPP TSG-RAN WG2 Meeting #115 electronic, R2-2107449 E-Meeting, Aug. 16-27, 2021), Title: "Impact on DRX Timers With UL/DL HARQ Enhancement in NTN". (Year: 2021).*
Partial International Search Report—PCT/US2022/076123—ISA/EPO—Dec. 12, 2022.
International Search Report and Written Opinion—PCT/US2022/076123—ISA/EPO—Feb. 2, 2023.

* cited by examiner

TRANSMISSION IN CONFIGURED GRANT AND SEMI-PERSISTENT SCHEDULING IN NON-TERRESTRIAL NETWORK

CROSS-REFERENCE TO RELATED APPLICATION

This Patent Application claims priority to U.S. Provisional Patent Application No. 63/263,408, filed on Nov. 2, 2021, entitled "TRANSMISSION IN CONFIGURED GRANT AND SEMI-PERSISTENT SCHEDULING IN NON-TERRESTRIAL NETWORK," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for transmission in configured grant and semi-persistent scheduling in a non-terrestrial network.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving an indication to transmit a communication associated with a configured grant in a non-terrestrial network (NTN), the indication indicating a hybrid automatic repeat request (HARQ) process identifier and a configured grant index of the communication. The method may include performing a transmission of the communication based at least in part on the HARQ process identifier and the configured grant index.

Some aspects described herein relate to a method of wireless communication performed by a network node. The method may include transmitting an indication for a UE to monitor for a communication associated with an SPS configuration in an NTN, the indication indicating a HARQ feedback identifier and an SPS index of the communication. The method may include performing a transmission of the communication that includes the HARQ feedback identifier and the SPS index.

Some aspects described herein relate to a method of wireless communication performed by a UE. The method may include receiving an indication that a first set of HARQ process identifiers is reserved for a first periodic communication configuration. The method may include performing a retransmission of a communication, in accordance with a second periodic communication configuration, using a second set of HARQ process identifiers that does not overlap with the first set of HARQ process identifiers.

Some aspects described herein relate to a method of wireless communication performed by a network node. The method may include obtaining an indication that a first set of HARQ process identifiers is reserved for a first periodic communication configuration. The method may include performing a retransmission of a communication, in accordance with a second periodic communication configuration, using a second set of HARQ process identifiers that does not overlap with the first set of HARQ process identifiers.

Some aspects described herein relate to an apparatus for wireless communication performed by a UE. The apparatus may include a memory and one or more processors, coupled to the memory. The one or more processors may be configured to receive an indication to transmit a communication associated with a configured grant in an NTN, the indication indicating a HARQ process identifier and a configured grant index of the communication. The one or more processors may be configured to perform a transmission of the communication based at least in part on the HARQ process identifier and the configured grant index.

Some aspects described herein relate to an apparatus for wireless communication performed by a network node. The apparatus may include a memory and one or more processors, coupled to the memory. The one or more processors may be configured to transmit an indication for a UE to monitor for a communication associated with an SPS configuration in an NTN, the indication indicating a HARQ feedback identifier and an SPS index of the communication. The one or more processors may be configured to perform a transmission of the communication that includes the HARQ feedback identifier and the SPS index.

Some aspects described herein relate to an apparatus for wireless communication performed by a UE. The apparatus may include a memory and one or more processors, coupled to the memory. The one or more processors may be configured to receive an indication that a first set of HARQ process identifiers is reserved for a first periodic communication configuration. The one or more processors may be configured to perform a retransmission of a communication, in accordance with a second periodic communication configuration, using a second set of HARQ process identifiers that does not overlap with the first set of HARQ process identifiers.

Some aspects described herein relate to an apparatus for wireless communication performed by a network node. The apparatus may include a memory and one or more processors, coupled to the memory. The one or more processors may be configured to obtain an indication that a first set of HARQ process identifiers is reserved for a first periodic communication configuration. The one or more processors may be configured to perform a retransmission of a communication, in accordance with a second periodic communication configuration, using a second set of HARQ process identifiers that does not overlap with the first set of HARQ process identifiers.

Some aspects described herein relate to a non-transitory computer-readable medium that stores a set of instructions for wireless communication by a UE. The set of instructions, when executed by one or more processors of the UE, may cause the UE to receive an indication to transmit a communication associated with a configured grant in an NTN, the indication indicating a HARQ process identifier and a configured grant index of the communication. The set of instructions, when executed by one or more processors of the UE, may cause the UE to perform a transmission of the communication based at least in part on the HARQ process identifier and the configured grant index.

Some aspects described herein relate to a non-transitory computer-readable medium that stores a set of instructions for wireless communication by a network node. The set of instructions, when executed by one or more processors of the network node, may cause the network node to transmit an indication for a UE to monitor for a communication associated with an SPS configuration in an NTN, the indication indicating a HARQ feedback identifier and an SPS index of the communication. The set of instructions, when executed by one or more processors of the network node, may cause the network node to perform a transmission of the communication that includes the HARQ feedback identifier and the SPS index.

Some aspects described herein relate to a non-transitory computer-readable medium that stores a set of instructions for wireless communication by a UE. The set of instructions, when executed by one or more processors of the UE, may cause the UE to receive an indication that a first set of HARQ process identifiers is reserved for a first periodic communication configuration. The set of instructions, when executed by one or more processors of the UE, may cause the UE to perform a retransmission of a communication, in accordance with a second periodic communication configuration, using a second set of HARQ process identifiers that does not overlap with the first set of HARQ process identifiers.

Some aspects described herein relate to a non-transitory computer-readable medium that stores a set of instructions for wireless communication by a network node. The set of instructions, when executed by one or more processors of the network node, may cause the network node to obtain an indication that a first set of HARQ process identifiers is reserved for a first periodic communication configuration. The set of instructions, when executed by one or more processors of the network node, may cause the network node to perform a retransmission of a communication, in accordance with a second periodic communication configuration, using a second set of HARQ process identifiers that does not overlap with the first set of HARQ process identifiers.

Some aspects described herein relate to an apparatus for wireless communication. The apparatus may include means for receiving an indication to transmit a communication associated with a configured grant in an NTN, the indication indicating a HARQ process identifier and a configured grant index of the communication. The apparatus may include means for performing a transmission of the communication based at least in part on the HARQ process identifier and the configured grant index.

Some aspects described herein relate to an apparatus for wireless communication. The apparatus may include means for transmitting an indication for a UE to monitor for a communication associated with an SPS configuration in an NTN, the indication indicating a HARQ feedback identifier and an SPS index of the communication. The apparatus may include means for performing a transmission of the communication that includes the HARQ feedback identifier and the SPS index.

Some aspects described herein relate to an apparatus for wireless communication. The apparatus may include means for receiving an indication that a first set of HARQ process identifiers is reserved for a first periodic communication configuration. The apparatus may include means for performing a retransmission of a communication, in accordance with a second periodic communication configuration, using a second set of HARQ process identifiers that does not overlap with the first set of HARQ process identifiers.

Some aspects described herein relate to an apparatus for wireless communication. The apparatus may include means for obtaining an indication that a first set of HARQ process identifiers is reserved for a first periodic communication configuration. The apparatus may include means for performing a retransmission of a communication, in accordance with a second periodic communication configuration, using a second set of HARQ process identifiers that does not overlap with the first set of HARQ process identifiers.

Aspects generally include a method, apparatus, system, computer program product, non-transitory computer-readable medium, user equipment, base station, network node, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
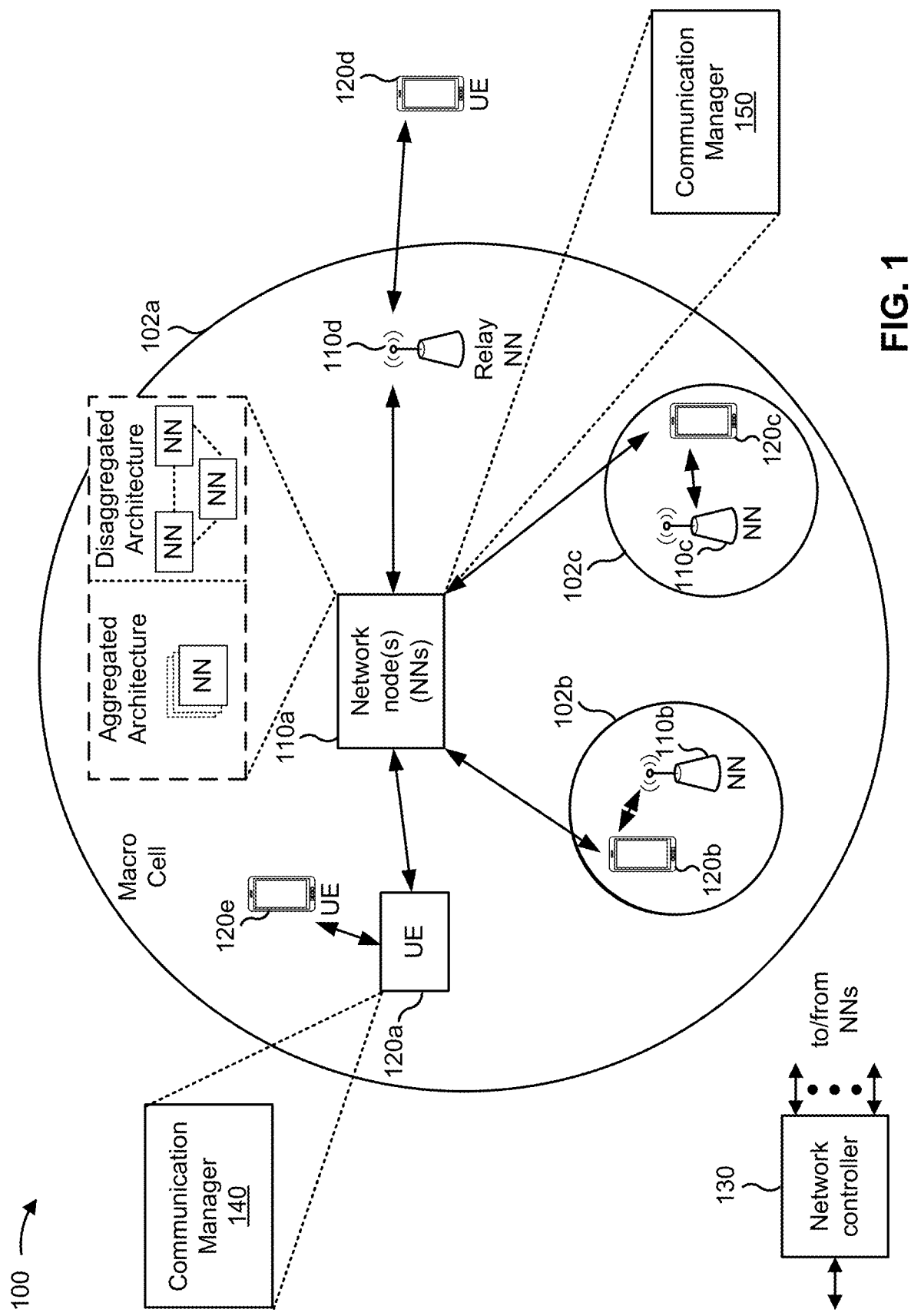
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive an indication to transmit a communication associated with a configured grant in a non-terrestrial network (NTN), the indication indicating a hybrid automatic repeat request (HARQ) process identifier and a configured grant index of the communication; and perform a transmission of the communication based at least in part on the HARQ process identifier and the configured grant index. Additionally, or alternatively, the communication manager 140 may perform one or more other operations described herein.

In some aspects, the network node 110 may include a communication manager 150. As described in more detail elsewhere herein, the communication manager 150 may transmit an indication for a user equipment (UE) to monitor for a communication associated with a semi-persistent scheduling (SPS) configuration in a non-terrestrial network (NTN), the indication indicating a hybrid automatic repeat request (HARQ) feedback identifier and an SPS index of the communication; and perform a transmission of the communication that includes the HARQ feedback identifier and the SPS index. Additionally, or alternatively, the communication manager 150 may perform one or more other operations described herein.

In some aspects, the communication manager 140 may receive an indication that a first set of HARQ process identifiers is reserved for a first periodic communication configuration; and perform a retransmission of a communication, in accordance with a second periodic communication configuration, using a second set of HARQ process identifiers that does not overlap with the first set of HARQ process identifiers. Additionally, or alternatively, the communication manager 140 may perform one or more other operations described herein.

In some aspects, the communication manager 150 may obtain an indication that a first set of HARQ process identifiers is reserved for a first periodic communication configuration; and perform a retransmission of a communication, in accordance with a second periodic communication configuration, using a second set of HARQ process identifiers that does not overlap with the first set of HARQ process identifiers. Additionally, or alternatively, the communication manager 150 may perform one or more other operations described herein.

In some aspects, the communication manager 140 may receive an indication to monitor for a communication associated with a SPS configuration in an NTN, the indication indicating a HARQ process identifier and an SPS index of the communication; and receive the communication based at least in part on the HARQ process identifier and the SPS index. Additionally, or alternatively, the communication manager 140 may perform one or more other operations described herein.

As indicated above, FIG. 1 is provided as an example. Other examples may differ from what is described with regard to FIG. 1.

Figure 2:
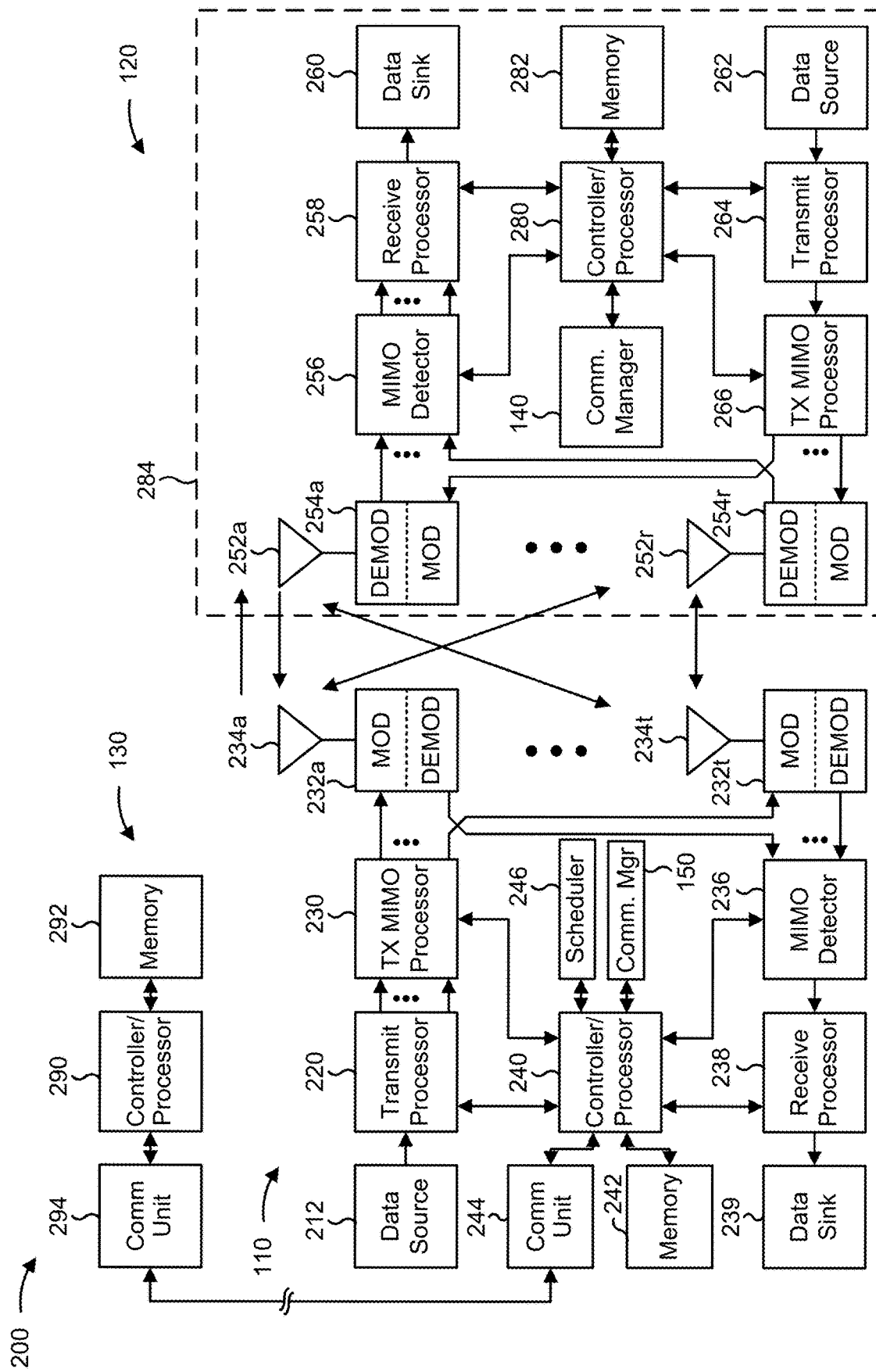
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples.

An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-14).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-14).

The controller/processor 240 of the network node 110, the controller/processor 280 of the UE 120, and/or any other component(s) of FIG. 2 may perform one or more techniques associated with transmission in configured grant and semi-persistent scheduling in a non-terrestrial network, as described in more detail elsewhere herein. For example, the controller/processor 240 of the network node 110, the controller/processor 280 of the UE 120, and/or any other component(s) of FIG. 2 may perform or direct operations of, for example, process 900 of FIG. 9, process 1000 of FIG. 10, process 1100 of FIG. 11, process 1200 of FIG. 12, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 900 of FIG. 9, process 1000 of FIG. 10, process 1100 of FIG. 11, process 1200 of FIG. 12, and/or other processes as described herein. In some examples, executing instructions may include running the instructions, converting the instructions, compiling the instructions, and/or interpreting the instructions, among other examples.

In some aspects, the UE includes means for receiving an indication to transmit a communication associated with a configured grant in an NTN, the indication indicating a HARQ process identifier and a configured grant index of the communication; and/or means for performing a transmission of the communication based at least in part on the HARQ process identifier and the configured grant index. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node includes means for transmitting an indication for a UE to monitor for a communication associated with an SPS configuration in an NTN, the indication indicating a HARQ feedback identifier and an SPS index of the communication; and/or means for performing a transmission of the communication that includes the HARQ feedback identifier and the SPS index. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the UE includes means for receiving an indication that a first set of HARQ process identifiers is reserved for a first periodic communication configuration; and/or means for performing a retransmission of a communication, in accordance with a second periodic communication configuration, using a second set of HARQ process identifiers that does not overlap with the first set of HARQ process identifiers. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node includes means for obtaining an indication that a first set of HARQ process identifiers is reserved for a first periodic communication configuration; and/or means for performing a retransmission of a communication, in accordance with a second periodic communication configuration, using a second set of HARQ process identifiers that does not overlap with the first set of HARQ process identifiers. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the UE includes means for receiving an indication to monitor for a communication associated with an SPS configuration in an NTN, the indication indicating a HARQ process identifier and an SPS index of the communication; and/or means for receiving the communication based at least in part on the HARQ process identifier and the SPS index. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
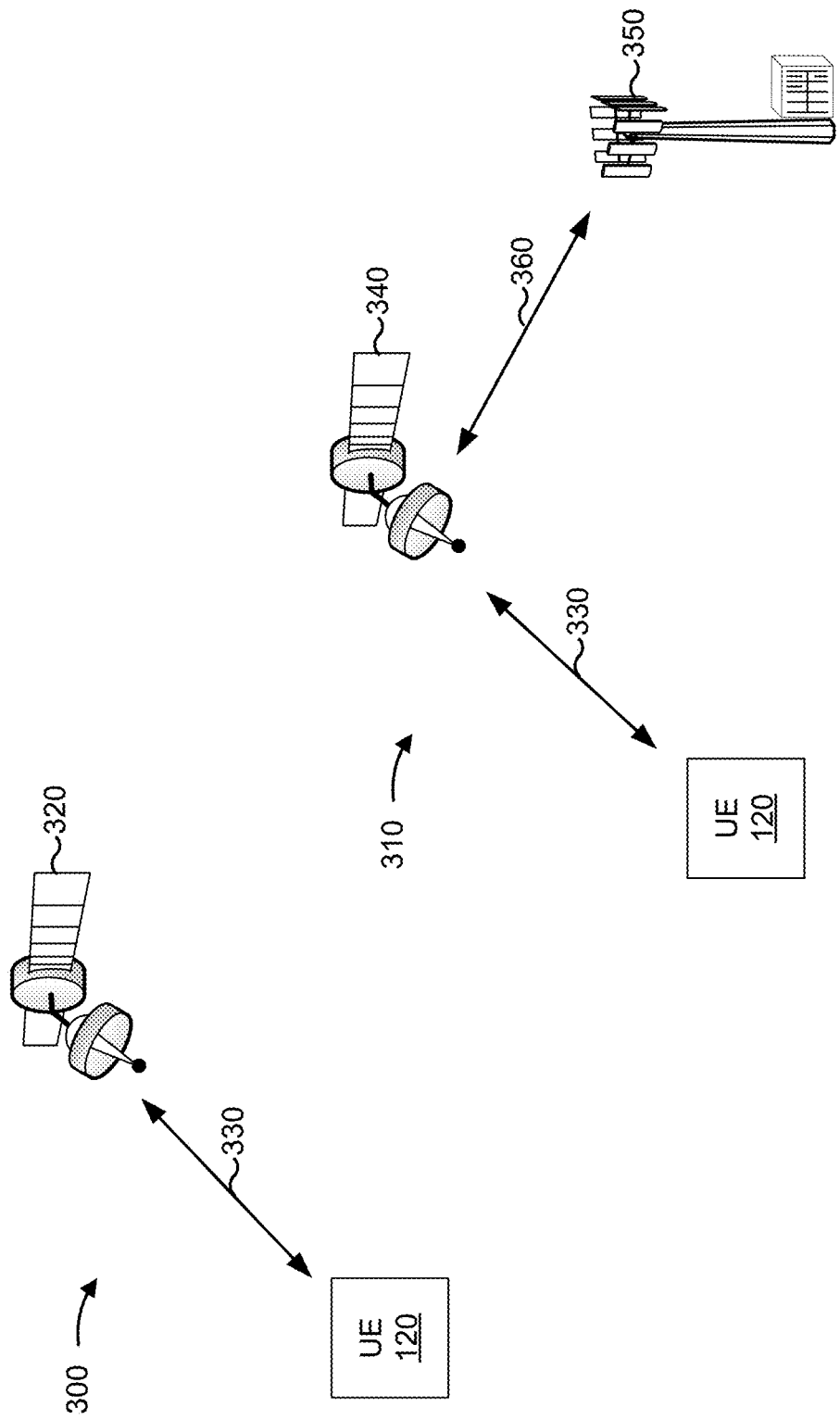
FIG. 3 is a diagram illustrating an example of a regenerative satellite deployment and a transparent satellite deployment in a non-terrestrial network (NTN), in accordance with the present disclosure.

FIG. 3 is a diagram illustrating an example 300 of a regenerative satellite deployment and an example 310 of a transparent satellite deployment in a non-terrestrial network.

Example 300 shows a regenerative satellite deployment. In example 300, a UE 120 is served by a satellite 320 via a service link 330. For example, the satellite 320 may include a network node (NN) 110 (e.g., NN 110a) or a gNB. In some aspects, the satellite 320 may be referred to as a non-terrestrial network node, a regenerative repeater, or an on-board processing repeater. In some aspects, the satellite 320 may demodulate an uplink radio frequency signal, and may modulate a baseband signal derived from the uplink radio signal to produce a downlink radio frequency transmission. The satellite 320 may transmit the downlink radio frequency signal on the service link 330. The satellite 320 may provide a cell that covers the UE 120.

Example 310 shows a transparent satellite deployment, which may also be referred to as a bent-pipe satellite deployment. In example 310, a UE 120 is served by a satellite 340 via the service link 330. The satellite 340 may be a transparent satellite. The satellite 340 may relay a signal received from gateway 350 via a feeder link 360. For example, the satellite may receive an uplink radio frequency transmission, and may transmit a downlink radio frequency transmission without demodulating the uplink radio frequency transmission. In some aspects, the satellite may frequency convert the uplink radio frequency transmission received on the service link 330 to a frequency of the uplink radio frequency transmission on the feeder link 360, and may amplify and/or filter the uplink radio frequency transmission. In some aspects, the UEs 120 shown in example 300 and example 310 may be associated with a Global Navigation Satellite System (GNSS) capability or a Global Positioning System (GPS) capability, though not all UEs have such capabilities. The satellite 340 may provide a cell that covers the UE 120.

The service link 330 may include a link between the satellite 340 and the UE 120, and may include one or more of an uplink or a downlink The feeder link 360 may include a link between the satellite 340 and the gateway 350, and may include one or more of an uplink (e.g., from the UE 120 to the gateway 350) or a downlink (e g , from the gateway 350 to the UE 120). An uplink of the service link 330 may be indicated by reference number 330-U (not shown in FIG. 3) and a downlink of the service link 330 may be indicated by reference number 330-D (not shown in FIG. 3). Similarly, an uplink of the feeder link 360 may be indicated by reference number 360-U (not shown in FIG. 3) and a downlink of the feeder link 360 may be indicated by reference number 360-D (not shown in FIG. 3).

The feeder link 360 and the service link 330 may each experience Doppler effects due to the movement of the satellites 320 and 340, and potentially movement of a UE 120. These Doppler effects may be significantly larger than in a terrestrial network. The Doppler effect on the feeder link 360 may be compensated for to some degree, but may still be associated with some amount of uncompensated frequency error. Furthermore, the gateway 350 may be associated with a residual frequency error, and/or the satellite 320/340 may be associated with an on-board frequency error. These sources of frequency error may cause a received downlink frequency at the UE 120 to drift from a target downlink frequency.

As described herein, communications between the UE 120 and the network node 110 in the NTN may take longer periods of time than communications in a terrestrial network (TN) or other non-NTN network. This is particularly true when HARQ feedback is requested for the communication.

As indicated above, FIG. 3 is provided as an example. Other examples may differ from what is described with regard to FIG. 3.

Figure 4:
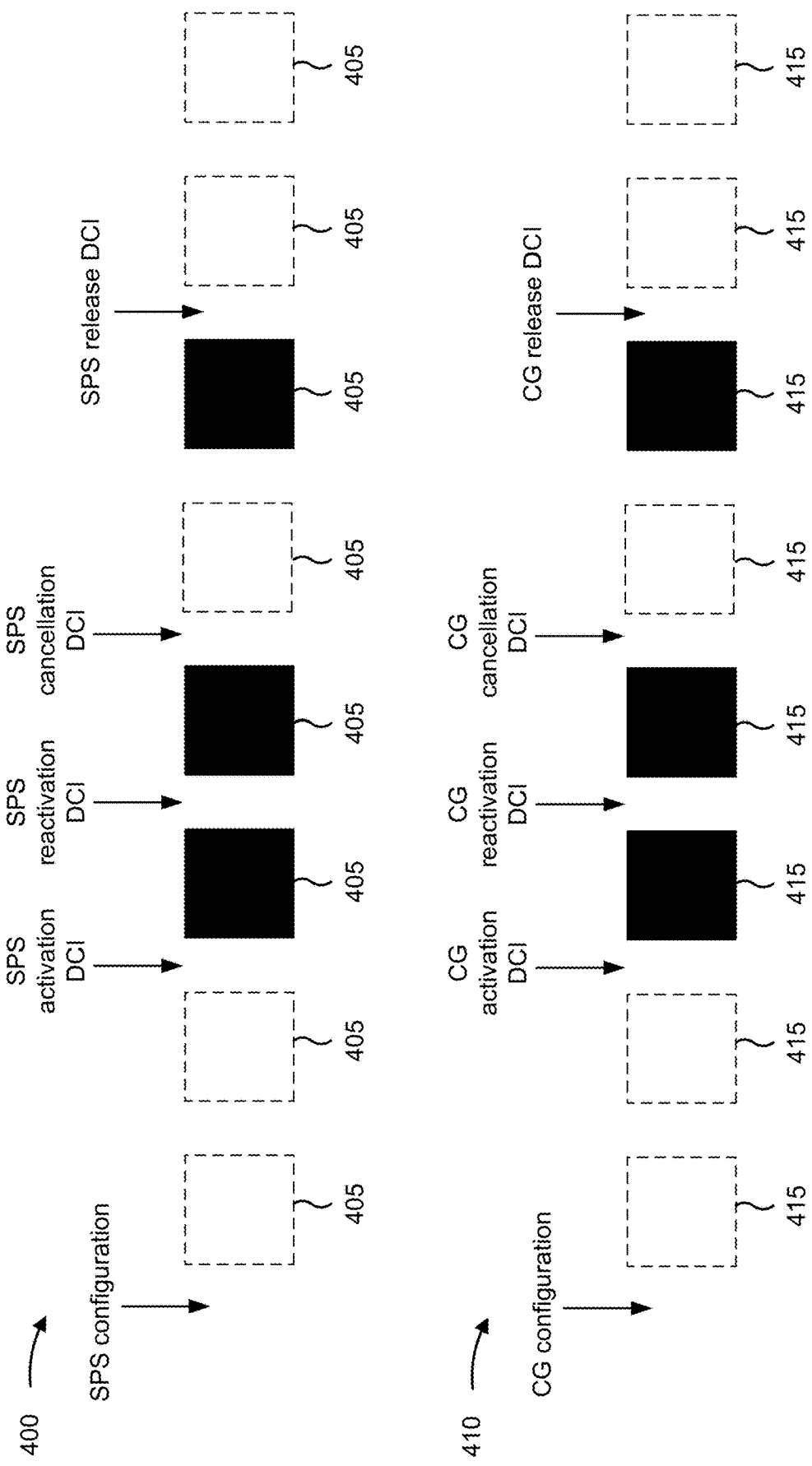
FIG. 4 is a diagram illustrating an example of downlink semi-persistent scheduling (SPS) communication and uplink configured grant communication, in accordance with the present disclosure.

FIG. 4 is a diagram illustrating an example 400 of downlink semi-persistent scheduling (SPS) communication and an example 410 of uplink configured grant (CG) communication, in accordance with the present disclosure. SPS communications may include periodic downlink communications that are configured for a UE, such that the network node does not need to send separate downlink control information (DCI) to schedule each downlink communication, thereby conserving signaling overhead. CG communications may include periodic uplink communications that are configured for a UE, such that the network node does not need to send separate DCI to schedule each uplink communication, thereby conserving signaling overhead.

As shown in example 400, a UE may be configured with an SPS configuration for SPS communications. For example, the UE may receive the SPS configuration via a radio resource control (RRC) message transmitted by a network node. The SPS configuration may indicate a resource allocation associated with SPS downlink communications (e.g., in a time domain, frequency domain, spatial domain, and/or code domain) and a periodicity at which the resource allocation is repeated, resulting in periodically reoccurring scheduled SPS occasions 405 for the UE. The SPS configuration may also configure hybrid automatic repeat request (HARQ)-acknowledgement (ACK) (HARQ-ACK) feedback resources for the UE to transmit HARQ-ACK feedback for SPS physical downlink shared channel (PDSCH) communications received in the SPS occasions 405. For example, the SPS configuration may indicate a PDSCH-to-HARQ feedback timing value, which may be referred to as a K1 value in a wireless communication standard (e.g., a 3GPP standard)

The network node may transmit SPS activation DCI to the UE to activate the SPS configuration for the UE. The network node may indicate, in the SPS activation DCI, communication parameters, such as an MCS, a resource block (RB) allocation, and/or antenna ports, for the SPS PDSCH communications to be transmitted in the scheduled SPS occasions 405. The UE may begin monitoring the SPS occasions 405 based at least in part on receiving the SPS activation DCI. For example, beginning with a next scheduled SPS occasion 405 subsequent to receiving the SPS activation DCI, the UE may monitor the scheduled SPS occasions 405 to decode PDSCH communications using the communication parameters indicated in the SPS activation DCI. The UE may refrain from monitoring configured SPS occasions 405 prior to receiving the SPS activation DCI.

The network node may transmit SPS reactivation DCI to the UE to change the communication parameters for the SPS PDSCH communications. Based at least in part on receiving the SPS reactivation DCI, the UE may begin monitoring the scheduled SPS occasions 405 using the communication parameters indicated in the SPS reactivation DCI. For example, beginning with a next scheduled SPS occasion 405 subsequent to receiving the SPS reactivation DCI, the UE may monitor the scheduled SPS occasions 405 to decode PDSCH communications based on the communication parameters indicated in the SPS reactivation DCI.

In some cases, such as when the network node does not have downlink traffic to transmit to the UE, the network node may transmit SPS cancellation DCI to the UE to temporarily cancel or deactivate one or more subsequent SPS occasions 405 for the UE. The SPS cancellation DCI may deactivate only a subsequent one SPS occasion 405 or a subsequent N SPS occasions 405 (where N is an integer). SPS occasions 405 after the one or more (e.g., N) SPS occasions 405 subsequent to the SPS cancellation DCI may remain activated. Based at least in part on receiving the SPS cancellation DCI, the UE may refrain from monitoring the one or more (e.g., N) SPS occasions 405 subsequent to receiving the SPS cancellation DCI. As shown in example 400, the SPS cancellation DCI cancels one subsequent SPS occasion 405 for the UE. After the SPS occasion 405 (or N SPS occasions) subsequent to receiving the SPS cancellation DCI, the UE may automatically resume monitoring the scheduled SPS occasions 405.

The network node may transmit SPS release DCI to the UE to deactivate the SPS configuration for the UE. The UE may stop monitoring the scheduled SPS occasions 405 based at least in part on receiving the SPS release DCI. For example, the UE may refrain from monitoring any scheduled SPS occasions 405 until another SPS activation DCI is received from the network node. Whereas the SPS cancellation DCI may deactivate only a subsequent one SPS occasion 405 or a subsequent N SPS occasions 405, the SPS release DCI deactivates all subsequent SPS occasions 405 for a given SPS configuration for the UE until the given SPS configuration is activated again by a new SPS activation DCI.

As shown in example 410, a UE may be configured with a CG configuration for CG communications. For example, the UE may receive the CG configuration via an RRC message transmitted by a network node. The CG configuration may indicate a resource allocation associated with CG uplink communications (e.g., in a time domain, frequency domain, spatial domain, and/or code domain) and a periodicity at which the resource allocation is repeated, resulting in periodically reoccurring scheduled CG occasions 415 for the UE. In some examples, the CG configuration may identify a resource pool or multiple resource pools that are available to the UE for an uplink transmission. The CG configuration may configure contention-five CG communications (e.g., where resources are dedicated for the UE to transmit uplink communications) or contention-based CG communications (e.g., where the UE contends for access to a channel in the configured resource allocation, such as by using a channel access procedure or a channel sensing procedure).

The network node may transmit CG activation DCI to the UE to activate the CG configuration for the UE. The network node may indicate, in the CG activation DCI, communication parameters, such as an MCS, an RB allocation, and/or antenna ports, for the CG physical uplink shared channel (PUSCH) communications to be transmitted in the scheduled CG occasions 415. The UE may begin transmitting in the CG occasions 415 based at least in part on receiving the CG activation DCI. For example, beginning with a next scheduled CG occasion 415 subsequent to receiving the CG activation DCI, the UE may transmit a PUSCH communication in the scheduled CG occasions 415 using the communication parameters indicated in the CG activation DCI. The UE may refrain from transmitting in configured CG occasions 415 prior to receiving the CG activation DCI.

The network node may transmit CG reactivation DCI to the UE to change the communication parameters for the CG PUSCH communications. Based at least in part on receiving the CG reactivation DCI, and the UE may begin transmitting in the scheduled CG occasions 415 using the communication parameters indicated in the CG reactivation DCI. For example, beginning with a next scheduled CG occasion 415 subsequent to receiving the CG reactivation DCI, the UE may transmit PUSCH communications in the scheduled CG occasions 415 based at least in part on the communication parameters indicated in the CG reactivation DCI.

In some cases, such as when the network node needs to override a scheduled CG communication for a higher priority communication, the network node may transmit CG cancellation DCI to the UE to temporarily cancel or deactivate one or more subsequent CG occasions 415 for the UE. The CG cancellation DCI may deactivate only a subsequent one CG occasion 415 or a subsequent N CG occasions 415 (where N is an integer). CG occasions 415 after the one or more (e.g., N) CG occasions 415 subsequent to the CG cancellation DCI may remain activated. Based at least in part on receiving the CG cancellation DCI, the UE may refrain from transmitting in the one or more (e.g., N) CG occasions 415 subsequent to receiving the CG cancellation DCI. As shown in example 410, the CG cancellation DCI cancels one subsequent CG occasion 415 for the UE. After the CG occasion 415 (or N CG occasions) subsequent to receiving the CG cancellation DCI, the UE may automatically resume transmission in the scheduled CG occasions 415.

The network node may transmit CG release DCI to the UE to deactivate the CG configuration for the UE. The UE may stop transmitting in the scheduled CG occasions 415 based at least in part on receiving the CG release DCI. For example, the UE may refrain from transmitting in any scheduled CG occasions 415 until another CG activation DCI is received from the network node. Whereas the CG cancellation DCI may deactivate only a subsequent one CG occasion 415 or a subsequent N CG occasions 415, the CG release DCI deactivates all subsequent CG occasions 415 for a given CG configuration for the UE until the given CG configuration is activated again by a new CG activation DCI.

As described herein, HARQ feedback may be requested in communications using a configured grant or an SPS configuration. The communication, and the associated HARQ feedback, may take longer periods of time in an NTN than the communication, and the associated HARQ feedback, would take in a TN.

As indicated above, FIG. 4 is provided as an example. Other examples may differ from what is described with respect to FIG. 4.

Figure 5:
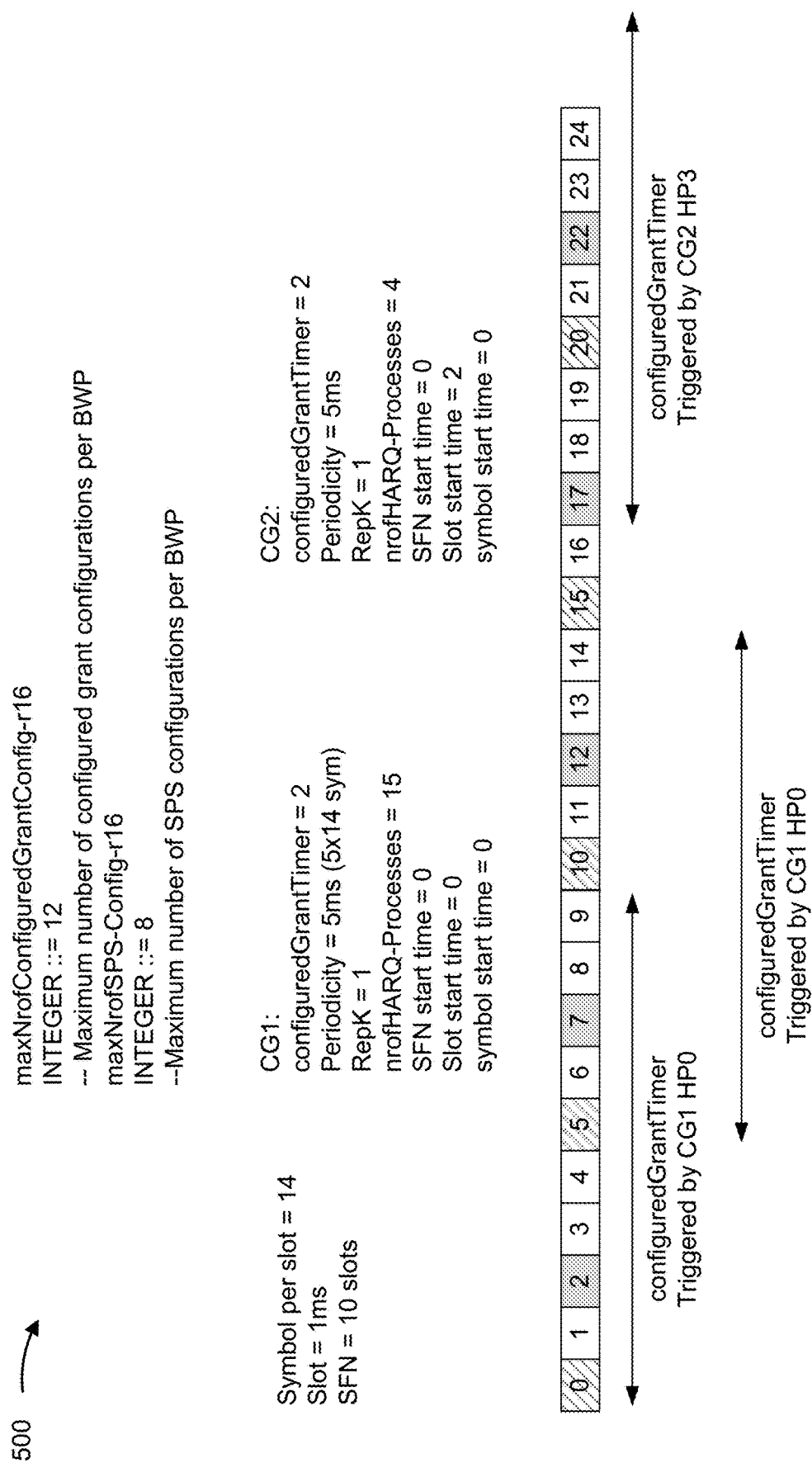
FIG. 5 is a diagram illustrating an example of configured grant timers, in accordance with the present disclosure.

FIG. 5 is a diagram illustrating an example 500 of configured grant timers, in accordance with the present disclosure. A network node, such as the network node 110, may communicate with a UE, such as the UE 120, using one or more downlink communications. The UE 120 may communicate with the network node 110 using one or more uplink communications. In some cases, a communication timeline for each of the downlink and uplink communications may be partitioned into units of radio frames (sometimes referred to as frames), which may be partitioned into a set of one or more subframes. Each subframe may have a predetermined duration, and may include a set of one or more slots. For example, a subframe may include 25 slots, each slot having a duration of 1 millisecond (ms). Each slot may include a set of fourteen symbol periods, or any number of symbol periods.

In some cases, the UE 120 may perform a transmission to the network node 110 in one of the slots, such as in accordance with a configured grant. As described above, a configured grant communication may include one or more periodic uplink communications that are configured for the UE 120, such that the network node 110 does not need to send separate DCI to schedule each uplink communication, thereby conserving signaling overhead.

In some aspects, the UE 120 may perform a transmission to the network node 110 in the slot 0 (zero). The transmission in the slot 0 may be associated with a HARQ feedback process. For example, the transmission in the slot 0 may be associated with a first HARQ feedback process identifier (HPI) HPI 0. A configured grant timer (CGT) (e.g., CGT 0) associated with the HARQ process may be initiated based at least in part on the transmission. For example, the UE 120 may wait for HARQ feedback from the network node 110 for the duration of the configured grant timer (e.g., 10 ms). The configured grant timer may continue to run for the duration of the configured grant timer, or until HARQ feedback associated with HPI 0 is received from the network node 110. In some cases, the UE 120 may not be able to perform any other transmissions associated with HPI 0 while the CGT 0 is running Thus, the UE 120 may not be able to perform any other transmissions associated with HPI 0 until the HARQ feedback associated with HPI 0 is received, or until the CGT 0 expires (e.g., at the end of the run time of CGT 0).

In some cases, the UE 120 may determine to perform another transmission (e.g., a retransmission of the communication) to the network node 110 at slot 5. The transmission to the network node 110 at slot 5 may be associated with a second HARQ process identifier (e.g., HPI 1). Thus, the transmission to the network node 110 at slot 5 may use a second configured grant timer (e.g., CGT 1). In this case, the UE 120 may be able to perform the transmission to the network node 110 whether or not CGT 0 is still running For example, the UE 120 may perform the transmission associated with HPI 1, and using CGT 1, to the network node 110, regardless of whether HARQ feedback associated with HPI 0 has been received, and regardless of whether the CGT 0 is still running In some cases, the UE 120 may determine to perform another transmission (e.g., a retransmission of the communication) to the network node 110 at slot 2. The transmission to the network node 110 at slot 2 may be associated with the HPI 0. Thus, the transmission to the network node 110 at slot 2 may use the CGT 0. In this case, the UE 120 may be able to perform the transmission to the network node 110 only if the CGT 0 is not running. Since the prior transmission at slot 0, and the transmission at slot 2, are associated with the same HARQ process identifier (HPI 0) and use the same configured grant timer (CGT 0), the UE 120 will not be able to perform another transmission associated with HPI 0, and using CGT 0, unless the CGT 0 that was initiated for the prior transmission has stopped running. For example, if the UE 120 receives HARQ feedback associated with the prior transmission (e.g., at slot 1), before initiating the transmission at slot 2, the CGT 0 may be stopped, and the UE 120 may be able to perform another transmission associated with HPI 0 and using CGT 0. However, if the UE 120 does not receive HARQ feedback associated with the prior transmission, before initiating the transmission at slot 2, the CGT 0 may still be running, and the UE 120 may not be able to perform another transmission associated with HPI 0 and using CGT 0 until the HARQ feedback for the prior transmission is received, or until the CGT 0 expires (e.g., after slot 9).

As described above, the UE 120 may not be able to perform another transmission until HARQ feedback for a previous transmission having the same HPI, or using the same CGT, has been received, or until the CGT has expired (e.g., after a run time of the CGT). This may not be problematic in certain networks where HARQ feedback is received relatively quickly (e.g., within one or a few ms). However, there is a greater likelihood that this will be problematic in an NTN. As described above, an NTN may involve a non-terrestrial network node 110, or a non-terrestrial UE 120. Thus, communications between the UE 120 and the network node 110 may take longer periods of time. This may be compounded when HARQ feedback is requested, since the feedback between the UE 120 and the network node 110 may also take longer periods of time. Thus, the likelihood that a communication having an HPI will not be able to be communicated, due to a previous communication having the same HPI, is increased. For example, a transmission from the UE 120 to the network node 110 in an NTN may take twice as long as a transmission from the UE 120 to the network node 110 in a TN. Additionally, the HARQ feedback transmitted from the network node 110 to the UE 120 in the NTN may take twice as long as a transmission from the network node 110 to the UE 120 in a TN. Thus, the round trip time may be four times as long in the NTN as compared to the TN, and the likelihood that a configured grant timer will still be running during a time that the UE 120 attempts to perform a next transmission is increased.

Techniques and apparatuses are described herein for performing a transmission of a communication using a HARQ process identifier, and a configured grant or SPS index. A UE may receive an indication to transmit a communication associated with a configured grant. The indication to transmit the communication may indicate a HARQ process identifier and a configured grant index of the communication. In some aspects, the HARQ process identifier may be associated with a plurality of configured grant indexes, and each of the configured grant indexes may be associated with a configured grant timer. In some aspects, the configured grant index may indicate whether the HARQ process is enabled or disabled for a communication. The UE may perform a transmission (e.g., a retransmission) of the communication based at least in part on the HARQ process identifier and the configured grant index.

As described in more detail herein, the configured grant index may reduce the likelihood that a transmission of a communication cannot be performed due to the overlapping timers. In some aspects, each configured grant index may be associated with a configured grant timer. Since the HARQ process identifier may be associated with multiple configured grant indexes, multiple timers may therefore be used for communications having the same HARQ process identifier. In some aspects, the indication may indicate that a transmission may be performed without using a timer, or may be performed using a different timer other than the configured grant timer. In some aspects, the configured grant index may indicate whether the HARQ process should be enabled or disabled for a communication. For example, a first state of the configured grant index may indicate that the HARQ process should be enabled, while a second state of the configured grant index may indicate that the HARQ process should be disabled. In some aspects, the HARQ process identifier may be offset to reduce the likelihood that two communications that use the same HARQ process identifier, and the same configured grant timer, will interfere with each other. By configuring multiple timers for communications using the HARQ process, configuring other timers for communications using the HARQ process, selectively enabling or disabling the HARQ process for the communication, or applying an offset to the HARQ process identifier, the likelihood of interference between two timers associated with the same HARQ process identifier may be reduced. Communication quality may therefore be improved since fewer communications are likely to be dropped as a result of the interfering timers.

While the example of FIG. 5 is described in the context of uplink communications for a configured grant, one or more of the same techniques and apparatuses may be used in the context of downlink communications for an SPS configuration. For example, the network node 110 may transmit a first communication to the UE 120, and may not be able to transmit a second communication (e.g., a retransmission of the first communication) until HARQ feedback associated with the first communication has been received. Thus, an SPS index may be introduced for the HARQ process identifier in the downlink communication. Additional details are described below.

As indicated above, FIG. 5 is provided as an example. Other examples may differ from what is described with respect to FIG. 5.

Figure 6:
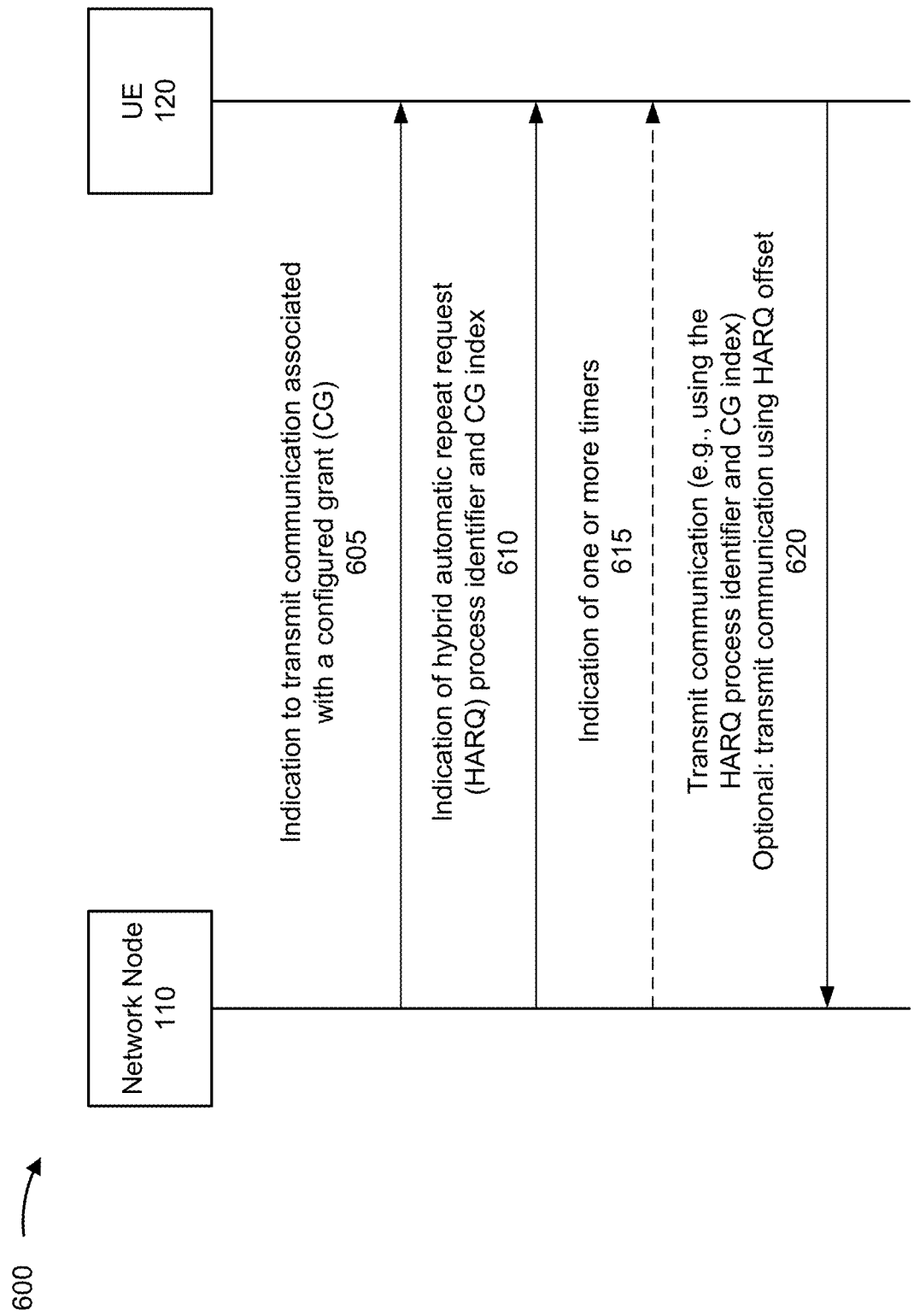
FIG. 6 is a diagram illustrating an example associated with configured grant transmissions in an NTN, in accordance with the present disclosure.

FIG. 6 is a diagram illustrating an example 600 of configured grant transmissions in an NTN, in accordance with the present disclosure.

As shown in connection with reference number 605, the network node 110 may transmit, and the UE 120 may receive, an indication to transmit a communication associated with a configured grant. As described above, configured grant communications (e.g., communications associated with a configured grant) may include periodic uplink communications that are configured for the UE 120, such that the network node 110 does not need to send separate DCI to schedule each uplink communication, thereby conserving signaling overhead. In some aspects, the indication to transmit the communication may be an indication to transmit a communication in an NTN. As described above, the NTN may include a non-terrestrial network node 110 or a non-terrestrial UE 120, such as a satellite.

In some aspects, the indication to transmit the communication may be an indication to retransmit the communication. For example, the UE 120 may transmit a communication to the network node 110 with HARQ feedback enabled. The network node 110 may respond to the communication, in accordance with the HARQ feedback request, with an acknowledgement (ACK) message indicating that the communication was received, or a negative acknowledgement (NACK) message indicating that the communication was not received, or was received with an error. In some aspects, the UE 120 may retransmit the communication based at least in part on receiving the NACK message. In some aspects, the UE 120 may retransmit the communication based at least in part on not receiving any HARQ feedback.

As shown in connection with reference number 610, the network node 110 may transmit, and the UE 120 may receive, an indication of a HARQ process identifier and a configured grant index of the communication. In some aspects, the indication of the HARQ process identifier and the configured grant index may be received in the same communication as the indication to transmit the communication. In some aspects, the indication of the HARQ process identifier and the configured grant index may be received in a different communication than the indication to transmit the communication.

In some aspects, the indication may be received via DCI. For example, the configured grant index may be indicated in a portion of the DCI that is reserved for physical uplink shared channel (PUSCH) scheduling. The portion of the DCI that is reserved for the PUSCH scheduling (e.g., DCI format 0_1) may be re-purposed to indicate the configured grant index. In this example, the network node 110 may not need to extend the DCI to transmit the indication of the configured grant index. Alternatively, the DCI may be extended to include one or more bits that indicate the configured grant index. For example, one or more additional bits (e.g., four bits) may be added to the DCI to indicate the configured grant index. In this example, the network node 110 may not need to alter existing portions of the DCI to transmit the indication of the configured grant index.

In some aspects, a physical downlink control channel (PDCCH) with a single cell radio network temporary identifier (SC-RNTI) may be extended to indicate the configured grant index (e.g., in addition to the HPI). In some aspects, the DCI may be extended to include the configured grant index. For example, four bits may be repurposed when used with SC-RNTI. In some aspects, existing fields in the DCI may be repurposed for the DCI scheduling HARQ processes that belong to HARQ disabled process (e.g., HARQ feedback disabled or HARQ state B). For configured grant (DCI format 0_1), the sounding reference signal (SRS)/channel state information (CSI) request fields may be repurposed to indicate the configured grant index. In some aspects, four new bits may be added in a new DCI format for NTN (e.g., in the same DCI designed to extend HARQ PID to 32). In some aspects, the HARQ process ID field may be extended up to five bits for DCI 0-1/1-1 when the maximum supported HARQ processes number is configured as 32. In this case, four new bits for the configured grant index may also be introduced in the DCI.

In some aspects, a RNTI of the indication may be specific to the configured grant index. For example, a first configured grant index may be associated with a first RNTI, and a second configured grant index may be associated with a second RNTI. In this case, no change in DCI may be needed to indicate the configured grant index. In some aspects, a search space of a PDCCH in which the indication is received may be specific to the configured grant index. For example, a first configured grant index may be associated with a first search space of a PDCCH, and a second configured grant index may be associated with a second search space of the PDCCH. In this case, no change in DCI may be needed to indicate the configured grant index.

In some aspects, the indication may indicate to transmit the communication using one of a HARQ process identifier of a first ongoing HARQ process in the configured grant or a HARQ process identifier of a last ongoing HARQ process in the configured grant. For example, the UE 120 may transmit three communications, and may be waiting for HARQ feedback for each of the three communications. A first communication may be associated with a first HARQ process identifier HPI 0, a second communication may be associated with a second HARQ process identifier HPI 1, and a third communication may be associated with a third HARQ process identifier HPI 2. Thus, the indication may indicate to transmit the communication using the HARQ process identifier HPI 0 of the first transmission, or may indicate to transmit the communication using the HARQ process identifier HPI 2 of the third communication.

In some aspects, the configured grant index may indicate whether the HARQ process is enabled or disabled. For example, a first state of the configured grant index (e.g., state 0 or state A) may indicate that HARQ feedback is enabled, and a second state of the configured grant index (e.g., state 1 or state B) may indicate that HARQ feedback is disabled. In some aspects, the single bit may be indicated in the DCI. For example, a first state of the DCI (e.g., state 0) may indicate that HARQ feedback is enabled, and the second state of the DCI may indicate that HARQ feedback is disabled. When the HARQ process is enabled, the UE 120 may request HARQ feedback from the network node 110. When the HARQ process is disabled, the UE 120 may not request HARQ feedback from the network node 110.

In some aspects, the configured grant index may be indicated in a single bit of DCI. For example, the configured grant index may be indicated in a one bit field of the DCI that has been re-purposed with the SC-RNTI. In some aspects, the configured grant index may be indicated in a portion of DCI that was previously associated with an uplink shared channel (UL-SCH) indicator or a physical uplink control channel (PUCCH) indicator. In this example, the network node 110 may not need to extend the DCI to transmit the indication of whether the HARQ process is enabled or disabled. In some aspects, the configured grant index may be indicated in a single bit of DCI that uses a format associated with the NTN.

As shown in connection with reference number 615, the network node 110 may transmit, and the UE 120 may receive, an indication of one or more timers, such as one or more configured grant timers. As described above, the UE 120 may receive an indication of a HARQ process identifier and one or more configured grant indexes, and each of the configured grant indexes may be associated with a configured grant timer. Thus, the HARQ process identifier may be associated with multiple configured grant timers. For example, the timers may include a first configured grant timer CGT 0 that is associated with a first configured grant index (CGI) CGI 0, and a second configured grant timer CGT 1 that is associated with a second configured grant index CGI 1. Both the first configured grant timer CGT 0 and the second configured grant timer CGT 1 may be associated with the same HARQ process identifier HPI 0.

In some aspects, the indication of the one or more timers may be received in the same communication as the indication of the configured grant index. In some aspects, the indication of the one or more timers may be received in a separate communication than the indication of the configured grant index. In some aspects, the UE 120 may be configured (e.g., pre-configured) with information associated with the one or more timers.

As shown in connection with reference number 620, the UE 120 may transmit, and the network node 110 may receive, a communication having the HARQ process identifier and the configured grant index. For example, the UE 120 may transmit a first communication and a second communication. The first communication may be associated with the HARQ process identifier HPI 0 and the first configured grant index CGI 0, and the second transmission may be associated with the HARQ process identifier HPI 0 and the configured grant index CGI 1. The second communication may be a retransmission of the first communication, or may be a transmission of a communication that is different than the first communication.

In some aspects, the UE 120 may transmit a communication using the first configured grant timer CGT 0. The UE 120 may determine that a transmission of a next communication (e.g., a retransmission of the communication) will also use the first configured grant timer CGT 0. In some aspects, the UE 120 may determine that the first configured grant timer CGT 0 is still running, and may skip the transmission (e.g., will not transmit) the next communication. In some aspects, the UE 120 may determine that the first configured grant timer CGT 0 is still running, and may transmit the next communication using a timer that is not associated with the configured grant. For example, the UE 120 may transmit the next communication using a discontinuous reception (DRX) timer. Thus, the UE 120 may be able to transmit the next communication without interference from the first configured grant timer CGT 0. In some aspects, the UE 120 may determine that the first configured grant timer CGT 0 is still running, and may transmit the next communication without using any timer (e.g., in a blind transmission).

In some aspects, the UE 120 may transmit a first communication having a first configured grant index CGI 0 and using the first configured grant timer CGT 0, and may transmit a second communication having a second configured grant index CGI 1 and using a second configured grant timer CGT 1. The first communication and the second communication may have the same HARQ process identifier (e.g., HPI 0). In some aspects, the UE 120 may transmit the second communication while the first configured grant timer CGT 0 is still running For example, CGT 0 may still be in a run state (e.g., an active state) from the transmission of the first communication when the UE 120 initiates the transmission of the second communication.

As described above, communications having the same HARQ process identifier, transmitted without the configured grant index, may use the same timer. For example, the UE 120 may transmit the first communication having the first HARQ process identifier and using the first timer. The UE 120 would not be able to transmit a second communication having the first HARQ process identifier and using the first timer until the HARQ feedback for the first communication is received, or until the first timer has expired (e.g., after 10 ms). However, as described herein, the configured grant index may enable multiple communications having the same HARQ process identifier to be transmitted using multiple separate timers. Although the example above describes two configured grant indexes, and two configured grant timers, associated with the HARQ process identifier, any number of configured grant indexes, and any number of configured grant timers, may be associated with the HARQ process identifier. Thus, any number of transmissions using the same HARQ process identifier may be transmitted using the multiple different timers.

In some aspects, the network node 110 may transmit, and UE 120 may receive, an indication (not shown in the figure) of a plurality of HARQ process identifiers of a configured grant configuration. Instead of communicating using a HARQ process identifier with multiple configured grant indexes, as described above, the UE 120 and the network node 110 may communicate using one or more selected HARQ process identifiers of the configured grant configuration that do not interfere with one or more other HARQ process identifiers of the configured grant configuration. Additional details regarding the HARQ process identifiers are provided below in connection with FIG. 8.

As indicated above, FIG. 6 is provided as an example. Other examples may differ from what is described with respect to FIG. 6.

Figure 7:
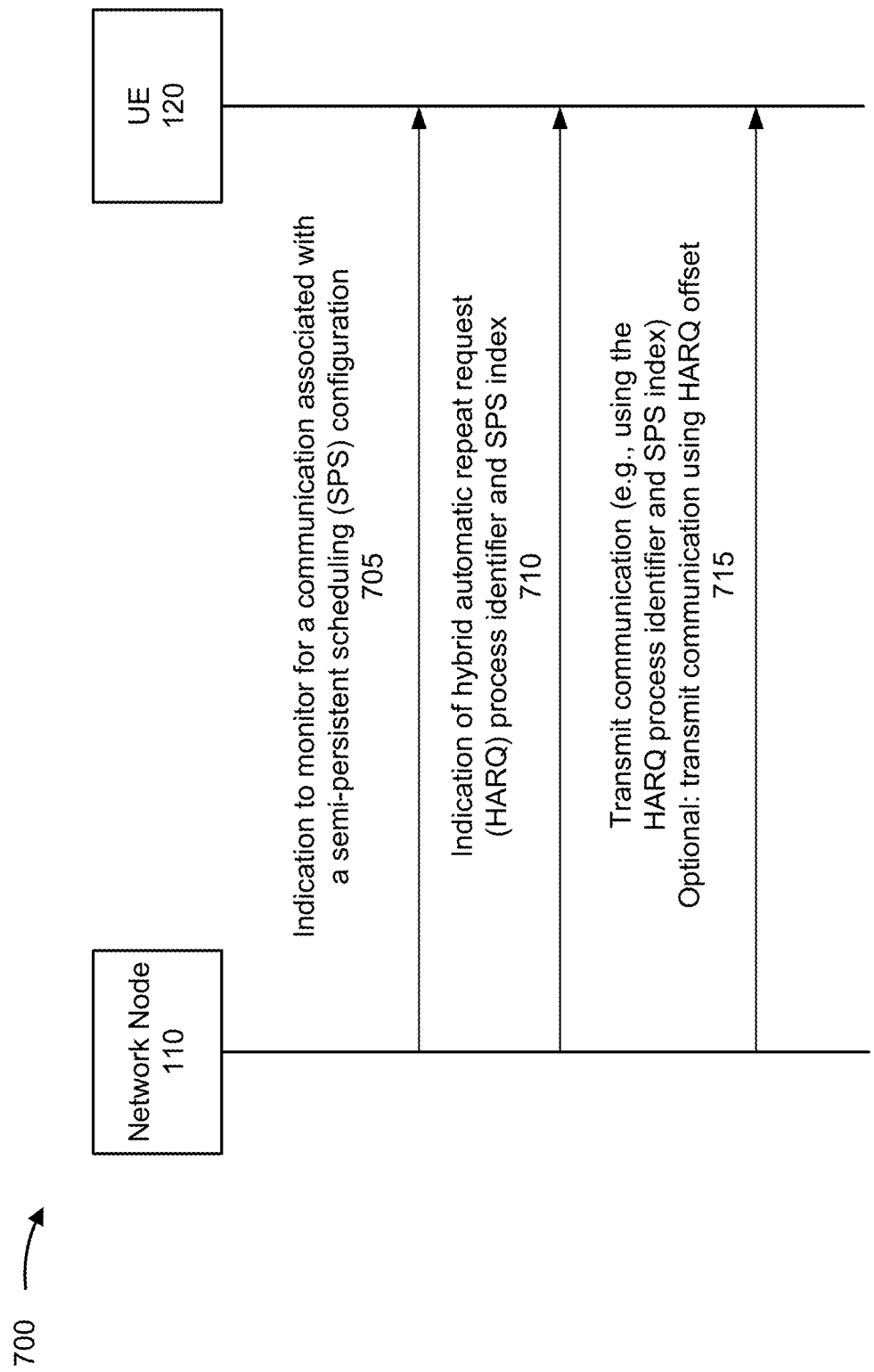
FIG. 7 is a diagram illustrating an example associated with SPS transmissions in an NTN, in accordance with the present disclosure.

FIG. 7 is a diagram illustrating an example 700 of SPS transmissions in an NTN, in accordance with the present disclosure.

As shown in connection with reference number 705, the network node 110 may transmit, and the UE 120 may receive, an indication for the UE 120 to monitor for a communication associated with an SPS configuration. SPS communications (e.g., communications associated with the SPS configuration) may include periodic downlink communications that are configured for the UE 120, such that the network node does not need to send separate DCI to schedule each downlink communication, thereby conserving signaling overhead. In some aspects, the indication to monitor for the communication may be an indication to monitor for a communication in an NTN. As described above, the NTN may include a non-terrestrial network node 110 or a non-terrestrial UE 120, such as a satellite.

In some aspects, the indication to monitor for the communication may be an indication to monitor for a retransmission of the communication. For example, the network node 110 may transmit a communication to the UE 120 with HARQ feedback enabled. The UE 120 may respond to the communication, in accordance with the HARQ feedback request, with an ACK message indicating that the communication was received, or a NACK message indicating that the communication was not received, or was received with an error. In some aspects, the network node 110 may retransmit the communication based at least in part on receiving the NACK message. In some aspects, the network node 110 may retransmit the communication based at least in part on not receiving any HARQ feedback.

As shown in connection with reference number 710, the network node 110 may transmit, and the UE 120 may receive, an indication of a HARQ process identifier and an SPS index of the communication. In some aspects, the indication of the HARQ process identifier and the SPS index may be received in the same communication as the indication to monitor for the communication. In some aspects, the indication of the HARQ process identifier and the SPS index may be received in a different communication than the indication to monitor for the communication.

In some aspects, the indication may be received via DCI. For example, the SPS index may be indicated in a portion of the DCI that is reserved for reserved for PUCCH or feedback timing indicators. In this example, the network node 110 may not need to extend the DCI to transmit the indication of the SPS index. Alternatively, the DCI may be extended to include one or more bits that indicate the SPS index. For example, one or more additional bits may be added to the DCI to indicate the SPS index. In this example, the network node 110 may not need to alter existing portions of the DCI to transmit the indication of the SPS index.

In some aspects, the DCI may be extended to include the SPS index. For example, four bits may be repurposed when used with SC-RNTI. In some aspects, existing fields in the DCI may be repurposed for the DCI scheduling HARQ processes that belong to HARQ disabled process (e.g., HARQ feedback disabled or HARQ state B). For SPS (DCI format 1_1), six bits for the PUCCH resource indicator and feedback timing indicator may be repurposed (e.g., for both 32 HARQ processes and SPS index) for HARQ process with disabled HARQ feedback. In some aspects, four new bits may be added in a new DCI format for NTN (e.g., in the same DCI designed to extend HARQ PID to 32). In some aspects, the HARQ process ID field may be extended up to five bits for DCI 0-1/1-1 when the maximum supported HARQ processes number is configured as 32. In this case, four new bits for the SPS index may also be introduced in the DCI.

In some aspects, an RNTI of the indication may be specific to the SPS index. For example, a first SPS index may be associated with a first RNTI, and a second SPS index may be associated with a second RNTI. In some aspects, a search space of a PDCCH in which the indication is received may be specific to the SPS index. For example, a first SPS index may be associated with a first search space of a PDCCH, and a second SPS index may be associated with a second search space of the PDCCH.

In some aspects, the indication may indicate to monitor for the communication having a HARQ process identifier of a first ongoing HARQ process in the SPS or a HARQ process identifier of a last ongoing HARQ process in the SPS. For example, the network node 110 may transmit three communications, and may be waiting for HARQ feedback for each of the three communications. A first communication may be associated with a first HARQ process identifier HPI 0, a second communication may be associated with a second HARQ process identifier HPI 1, and a third communication may be associated with a third HARQ process identifier HPI 2. Thus, the indication may indicate to monitor for the communication using the HARQ process identifier HPI 0 of the first transmission, or may indicate to monitor for the communication using the HARQ process identifier HPI 2 of the third communication.

In some aspects, the SPS index may indicate whether the HARQ process is enabled or disabled. For example, a first state of the SPS index (e.g., state 0 or state A) may indicate that HARQ feedback is enabled, and a second state of the SPS index (e.g., state 1 or state B) may indicate that HARQ feedback is disabled. In some aspects, the single bit may be indicated in the DCI. For example, a first state of the DCI (e.g., state 0) may indicate that HARQ feedback is enabled, and the second state of the DCI may indicate that HARQ feedback is disabled. When the HARQ process is enabled, the network node 110 may request HARQ feedback from the UE 120. When the HARQ process is disabled, the network node 110 may not request HARQ feedback from the UE 120.

In some aspects, the SPS index may be indicated in a single bit of sidelink control information (SCI) that is reserved for a UL-SCH indicator or a PUCCH indicator. In this example, the network node 110 may not need to extend the DCI to transmit the indication of whether the HARQ process is enabled or disabled. In some aspects, the SPS index may be indicated in a single bit of DCI that uses a format associated with the NTN.

As shown in connection with reference number 715, the network node 110 may transmit, and the UE 120 may receive, a communication having the HARQ process identifier and the SPS index. For example, the network node 110 may transmit a first communication and a second communication. The first transmission may be associated with the HARQ process identifier HPI 0 and the first SPS index SPS 0, and the second transmission may be associated with the HARQ process identifier HPI 0 and the SPS index SPS 1. The second communication may be a retransmission of the first communication, or may be a transmission of a communication that is different than the first communication.

In some aspects, the second communication may be transmitted at a time after the first communication that is less than the feedback timing value. If the first communication and the second communication have the same HARQ process identifier, and do not have an SPS index (or have the same SPS index), the second communication may not be able to be transmitted. For example, the second communication may not be able to be transmitted until after the HARQ feedback associated with the first communication has been received, or until after the time indicated by the feedback timing value K1. However, if the first communication and the second communication have different SPS indexes, the second communication may be transmitted any time after the first communication, even though the first communication and the second communication have the same HARQ process identifiers.

In some aspects, the value K1 may be 10 ms. In a first example, the first communication and the second communication may be transmitted with the same HARQ process identifier, and without an SPS index. Thus, the second communication may not be transmitted for a period of 10 ms after the transmission of the first communication, or until HARQ feedback associated with the first communication has been received. In a second example, the second communication having the first HARQ process identifier and the second SPS index SPS 1 may be transmitted at any time after the first communication having the first HARQ process identifier (e.g., the same HARQ process identifier) and the first SPS index SPS 0. For example, the second communication having the second SPS index SPS 1 may be transmitted 2 ms after the first communication having the first SPS index SPS 0, regardless of whether or not the HARQ feedback for the first communication has been received.

In some aspects, the network node 110 may transmit, and UE 120 may receive, an indication (not shown in the figure) of a plurality of HARQ process identifiers of an SPS configuration. Instead of communicating using a HARQ process identifier with multiple SPS indexes, as described above, the UE 120 and the network node 110 may communicate using one or more selected HARQ process identifiers of the SPS configuration that do not interfere with one or more other HARQ process identifiers of the SPS configuration. Additional details regarding the HARQ process identifiers are provided below in connection with FIG. 8.

As indicated above, FIG. 7 is provided as an example. Other examples may differ from what is described with respect to FIG. 7.

Figure 8:
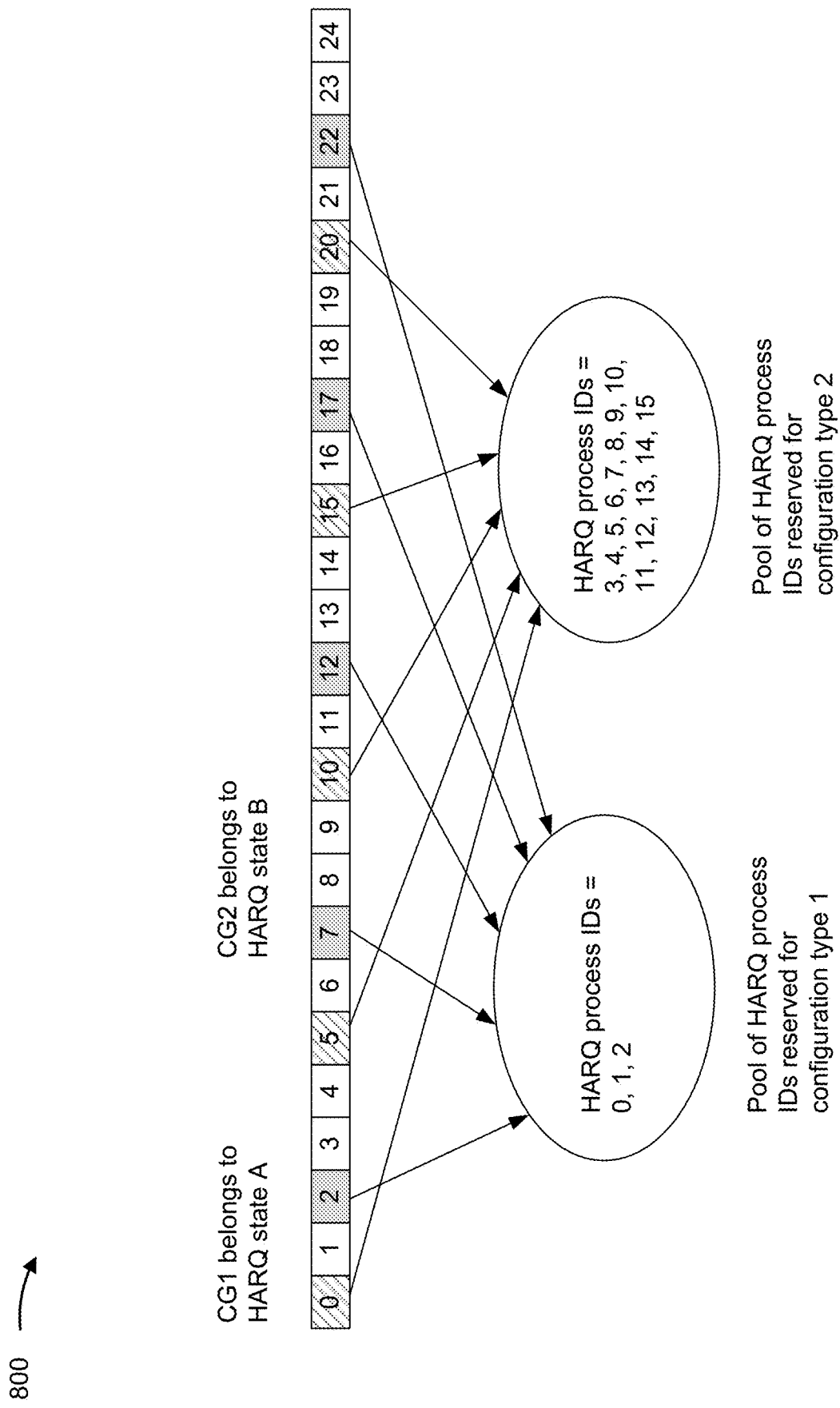
FIG. 8 is a diagram illustrating an example associated with communicating using a hybrid automatic repeat request (HARQ) process identifier offset, in accordance with the present disclosure.

FIG. 8 is a diagram illustrating an example 800 of communicating using a HARQ process identifier offset, in accordance with the present disclosure.

In some aspects, a UE, such as the UE 120, may receive an indication that a first set of HARQ process identifiers is reserved for a first periodic communication configuration, and may perform a retransmission of a communication, in accordance with a second periodic communication configuration, using a second set of HARQ process identifiers that does not overlap with the first set of HARQ process identifiers. In some aspects, the indication may indicate an offset to be applied to the retransmission of the communication based at least in part on the number of HARQ process identifiers in the first set of HARQ process identifiers. In some aspects, the first periodic communication configuration and the second periodic communication configuration are semi-persistent scheduling configurations. In some aspects, the first periodic communication configuration and the second periodic communication configuration are configured grant configurations. In some aspects, the first periodic communication configuration is a configured grant type 1 configuration and the second periodic communication configuration is a configured grant type 2 configuration.

In some aspects, the HARQ process identifier offset for the periodic communication configuration may be determined using the following example formula: HARQ Process ID=[floor(CURRENT_symbol/periodicity)] modulo nrof-HARQ-Processes+harq-ProcID-Offset2.

In some aspects, for HARQ feedback disabled SPS, or for HARQ feedback disabled configured grant, the number of HARQ processes may be equal to one. This may be shown as follows: nrofHARQ-process=1.

In some aspects, the HARQ process ID may be equal to zero for HARQ state B (e.g., HARQ process disabled).

In some aspects, when there are no HARQ process IDs that are equal to zero (e.g., HARQ process is enabled for all HARQ process IDs), the following rules may be considered:

HARQ process ID=0 is not used;

Add HARQ offset=1 to the existing HARQ process identifier calculation. In some aspects, the HARQ process identifiers may include integers one through fifteen (e.g., HPI=1-15); and The following formula may be used: HARQ Process ID=1+[floor(CURRENT_symbol/periodicity)] modulo (nrofHARQ-Processes-1).

In some aspects, if there are N configurations with HARQ state B, the HARQ process may be specified for each configuration. Similarly, if there are N SPS configurations with HARQ feedback disabled, the HARQ process may be specified for each configuration. The following rules may be considered:

For the first configuration, HP ID=0.

For the second configuration, HP ID=1.

For the $(N-1)^{th}$ configuration, HP ID=N-1.

For the rest of the configuration, the existing formula may be modified as follows to derive the HARQ process ID: HARQ Process ID=N+[floor(CURRENT_symbol/periodicity)] modulo (nrofHARQ-Processes-N).

In some aspects, no DCI signaling may be required. Instead, only the HP ID is sufficient to schedule the retransmission.

As shown in the example 800, a first configured grant (CG1) may have HARQ process ID 0, 1, 2. Thus, the HARQ process IDs for a second configured grant configuration (CG2) may start only from HARQ process ID 3. The number of configured grant pools may correspond to the number of configured grant configurations. For example, if there are N configured grant configurations, then there may be NHP ID pools. For CG1, the following formula may always result in HP ID=0, 1 or 2: HP ID =function(slot, 3). In contrast, for CG2, the formula may need an offset "3" because it must start from 3: HP ID=3+function(slot, 13).

As indicated above, FIG. 8 and the formulas described above are provided as examples. Other examples may differ from what is described with respect to FIG. 8.

Figure 9:
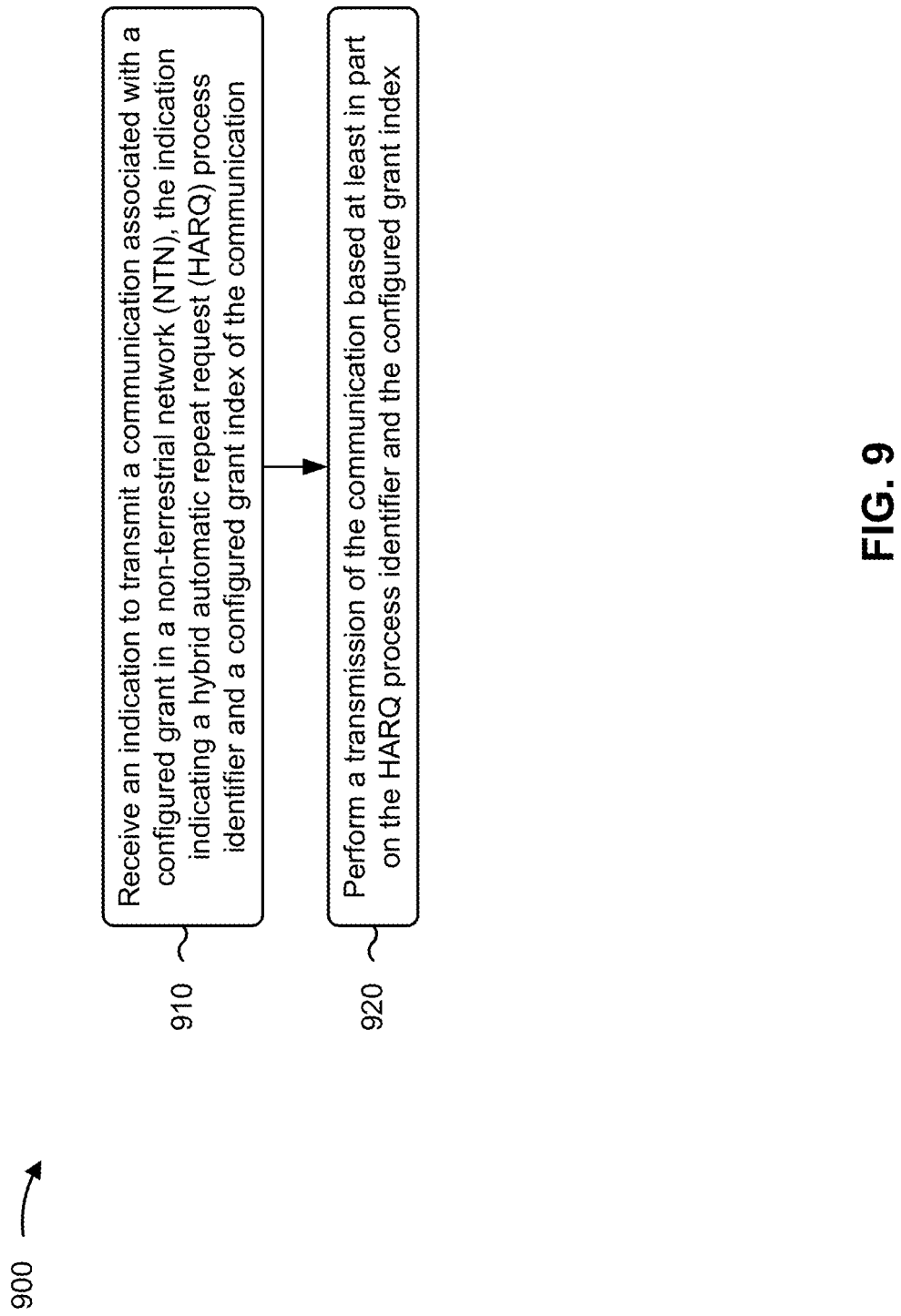
FIG. 9 is a diagram illustrating an example process associated with transmission in configured grant and SPS in a non-terrestrial network, in accordance with the present disclosure.

FIG. 9 is a diagram illustrating an example process 900 performed, for example, by a UE, in accordance with the present disclosure. Example process 900 is an example where the UE (e.g., UE 120) performs operations associated with transmission in configured grant and SPS in non-terrestrial network.

As shown in FIG. 9, in some aspects, process 900 may include receiving an indication to transmit a communication associated with a configured grant in an NTN, the indication indicating a HARQ process identifier and a configured grant index of the communication (block 910). For example, the UE (e.g., using communication manager 140 and/or reception component 1302, depicted in FIG. 13) may receive an indication to transmit a communication associated with a configured grant in an NTN, the indication indicating a HARQ process identifier and a configured grant index of the communication, as described above in connection with FIGS. 6-8.

As further shown in FIG. 9, in some aspects, process 900 may include performing a transmission of the communication based at least in part on the HARQ process identifier and the configured grant index (block 920). For example, the UE (e.g., using communication manager 140 and/or transmission component 1304, depicted in FIG. 13) may perform a transmission of the communication based at least in part on the HARQ process identifier and the configured grant index, as described above in connection with FIGS. 6-8.

Process 900 may include additional aspects, such as any single aspect or any combination of aspects described below and/or in connection with one or more other processes described elsewhere herein.

In a first aspect, process 900 includes identifying the configured grant index based at least in part on information indicated in the indication to transmit the communication.

In a second aspect, alone or in combination with the first aspect, receiving the indication includes receiving the indication via DCI.

In a third aspect, alone or in combination with one or more of the first and second aspects, the configured grant index is indicated in a portion of the DCI that is reserved for physical uplink shared channel scheduling.

In a fourth aspect, alone or in combination with one or more of the first through third aspects, the DCI is extended to include one or more bits that indicate the configured grant index.

In a fifth aspect, alone or in combination with one or more of the first through fourth aspects, a radio network temporary identifier of the indication is specific to the configured grant index.

In a sixth aspect, alone or in combination with one or more of the first through fifth aspects, a search space of a physical downlink control channel in which the indication is received is specific to the configured grant index.

In a seventh aspect, alone or in combination with one or more of the first through sixth aspects, the indication indicates to transmit the communication using a HARQ process identifier of a first ongoing HARQ process in the configured grant or a HARQ process identifier of a last ongoing HARQ process in the configured grant.

In an eighth aspect, alone or in combination with one or more of the first through seventh aspects, process 900 includes receiving information indicating one or more timers associated with the HARQ process identifier, wherein each timer of the one or more timers is associated with a different configured grant index.

In a ninth aspect, alone or in combination with one or more of the first through eighth aspects, the one or more timers include a first timer that is associated with the HARQ process identifier and the configured grant index, and a second timer that is associated with the HARQ process identifier and a second configured grant index.

In a tenth aspect, alone or in combination with one or more of the first through ninth aspects, process 900 includes performing the transmission of the communication using the first timer, and performing a transmission of a second communication, associated with the HARQ process identifier and the second configured grant index, using the second timer.

In an eleventh aspect, alone or in combination with one or more of the first through tenth aspects, performing the transmission of the second communication comprises performing the transmission of the second communication, using the second timer, while the first timer is running In a twelfth aspect, alone or in combination with one or more of the first through eleventh aspects, the transmission of the second communication is a retransmission of the communication.

In a thirteenth aspect, alone or in combination with one or more of the first through twelfth aspects, the transmission of the second communication is a communication of a different communication than the communication.

In a fourteenth aspect, alone or in combination with one or more of the first through thirteenth aspects, process 900 includes determining that a next transmission of the communication is associated with the first timer, and skipping the next transmission of the communication based at least in part on determining that the first timer is running In a fifteenth aspect, alone or in combination with one or more of the first through fourteenth aspects, process 900 includes determining that a transmission of a next communication is associated with the first timer, and performing the transmission of the next communication using a timer that is not associated with the configured grant.

In a sixteenth aspect, alone or in combination with one or more of the first through fifteenth aspects, the timer that is not associated with the configured grant includes a discontinuous reception timer.

In a seventeenth aspect, alone or in combination with one or more of the first through sixteenth aspects, the configured grant index includes a first state indicating that the HARQ process is enabled or a second state indicating that the HARQ process is disabled.

In an eighteenth aspect, alone or in combination with one or more of the first through seventeenth aspects, process 900 includes performing a transmission of a second communication, wherein the transmission of the communication includes the configured grant index and the transmission of the second communication includes a second configured grant index.

In a nineteenth aspect, alone or in combination with one or more of the first through eighteenth aspects, a scheduling of the transmission of the communication is received during a run time of a first configured grant timer, and a scheduling of the transmission of the second communication is received during a run time of a second configured grant timer, wherein the run time of the first configured grant timer at least partially overlaps with the run time of the second configured grant timer.

In a twentieth aspect, alone or in combination with one or more of the first through nineteenth aspects, the configured grant index is indicated in a single bit of DCI that was previously associated with an uplink shared channel indicator or a physical uplink control channel indicator.

In a twenty-first aspect, alone or in combination with one or more of the first through twentieth aspects, the configured grant index is indicated in a single bit of DCI that uses a format associated with an NTN.

In a twenty-second aspect, alone or in combination with one or more of the first through twenty-first aspects, the indication to transmit the communication is an indication to retransmit the communication, and performing the transmission of the communication includes performing a retransmission of the communication.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
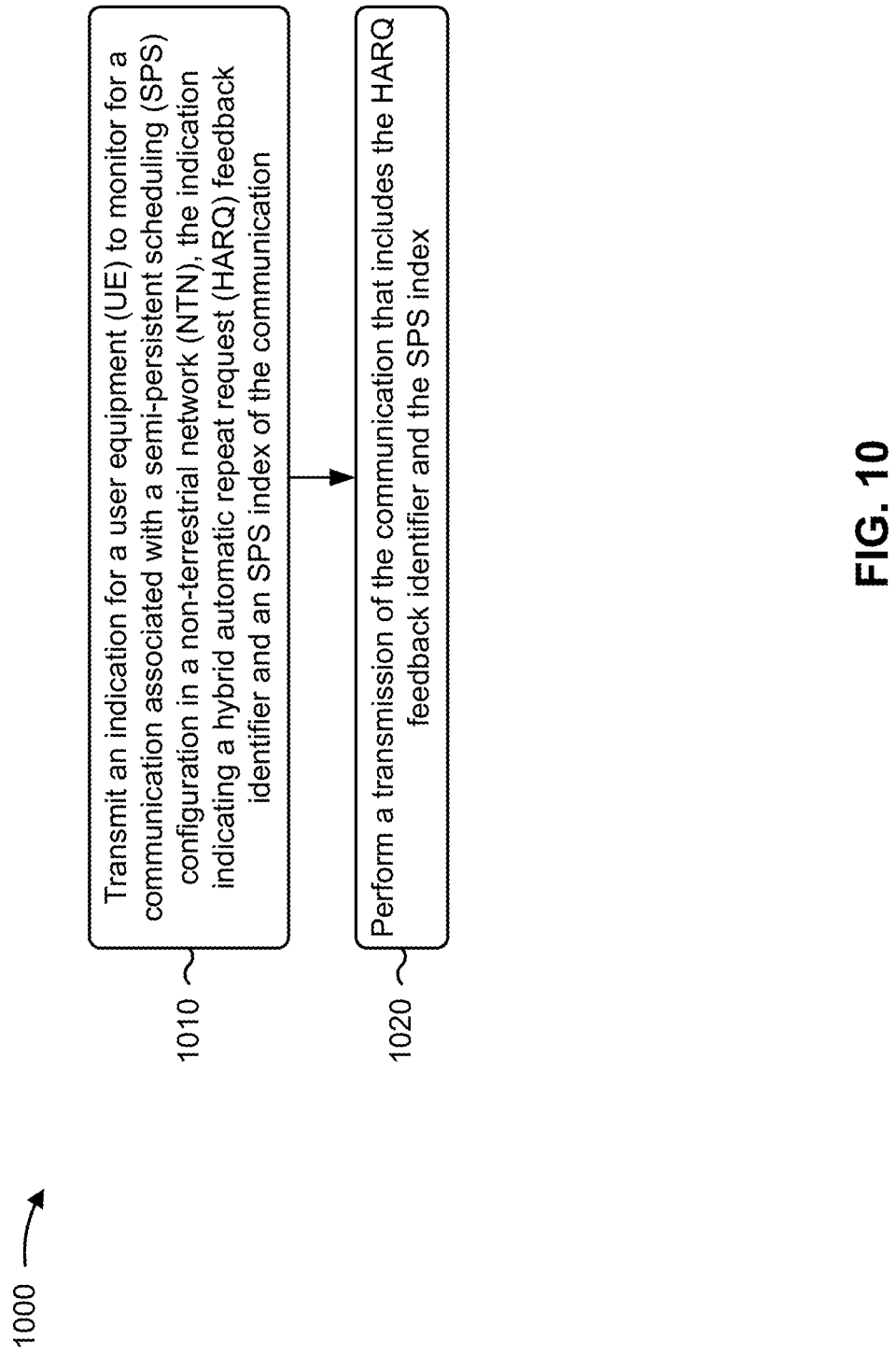
FIG. 10 is a diagram illustrating an example process associated with transmission in configured grant and SPS in a non-terrestrial network, in accordance with the present disclosure.

FIG. 10 is a diagram illustrating an example process 1000 performed, for example, by a network node, in accordance with the present disclosure. Example process 1000 is an example where the network node (e.g., network node 110) performs operations associated with transmission in configured grant and SPS in non-terrestrial network.

As shown in FIG. 10, in some aspects, process 1000 may include transmitting an indication for a UE to monitor for a communication associated with an SPS configuration in an NTN, the indication indicating a HARQ feedback identifier and an SPS index of the communication (block 1010). For example, the network node (e.g., using communication manager 150 and/or transmission component 1404, depicted in FIG. 14) may transmit an indication for a UE to monitor for a communication associated with an SPS configuration in an NTN, the indication indicating a HARQ feedback identifier and an SPS index of the communication, as described above in connection with FIGS. 6-8.

As further shown in FIG. 10, in some aspects, process 1000 may include performing a transmission of the communication that includes the HARQ feedback identifier and the SPS index (block 1020). For example, the network node (e.g., using communication manager 150 and/or transmission component 1404, depicted in FIG. 14) may perform a transmission of the communication that includes the HARQ feedback identifier and the SPS index, as described above in connection with FIGS. 6-8.

Process 1000 may include additional aspects, such as any single aspect or any combination of aspects described below and/or in connection with one or more other processes described elsewhere herein.

In a first aspect, process 1000 includes identifying the SPS index based at least in part on information indicated in the indication for the UE to monitor for the communication.

In a second aspect, alone or in combination with the first aspect, transmitting the indication includes transmitting the indication via DCI.

In a third aspect, alone or in combination with one or more of the first and second aspects, process 1000 includes including the SPS index in one or more bits of the DCI that is reserved for physical uplink control channel or feedback timing indicators.

In a fourth aspect, alone or in combination with one or more of the first through third aspects, process 1000 includes extending the DCI to include one or more bits that indicate the SPS index.

In a fifth aspect, alone or in combination with one or more of the first through fourth aspects, transmitting the indication includes transmitting a radio network temporary identifier of the indication that is specific to the SPS index.

In a sixth aspect, alone or in combination with one or more of the first through fifth aspects, transmitting the indication includes transmitting the indication in a physical downlink control channel having a search space that is specific to the SPS index.

In a seventh aspect, alone or in combination with one or more of the first through sixth aspects, the indication indicates to monitor for the communication having one of a HARQ feedback identifier of a first ongoing HARQ feedback in the SPS configuration or a HARQ feedback identifier of a last ongoing HARQ feedback in the SPS configuration.

In an eighth aspect, alone or in combination with one or more of the first through seventh aspects, the SPS index includes a first state indicating that the HARQ feedback is enabled or a second state indicating that the HARQ feedback is disabled.

In a ninth aspect, alone or in combination with one or more of the first through eighth aspects, process 1000 includes performing a transmission of a second communication, wherein the transmission of the communication includes the SPS index and the transmission of the second communication includes a second SPS index.

In a tenth aspect, alone or in combination with one or more of the first through ninth aspects, process 1000 includes including the SPS index in a single bit of downlink control information that is reserved for an uplink shared channel indicator or a physical uplink control channel indicator.

In an eleventh aspect, alone or in combination with one or more of the first through tenth aspects, process 1000 includes including the SPS index in a single bit of added downlink control information that uses a format associated with an NTN.

In a twelfth aspect, alone or in combination with one or more of the first through eleventh aspects, the indication to monitor for the communication is an indication to monitor for a retransmission of the communication.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
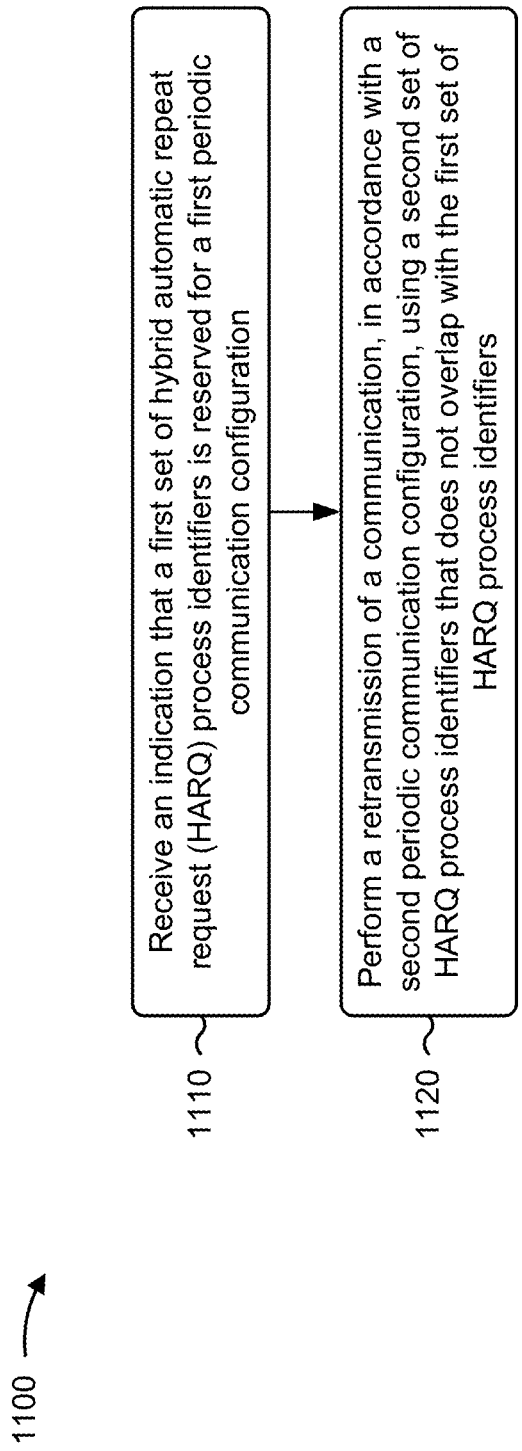
FIG. 11 is a diagram illustrating an example process associated with transmission in configured grant and SPS in a non-terrestrial network, in accordance with the present disclosure.

FIG. 11 is a diagram illustrating an example process 1100 performed, for example, by a UE, in accordance with the present disclosure. Example process 1100 is an example where the UE (e.g., UE 120) performs operations associated with transmission in configured grant and SPS in non-terrestrial network.

As shown in FIG. 11, in some aspects, process 1100 may include receiving an indication that a first set of HARQ process identifiers is reserved for a first periodic communication configuration (block 1110). For example, the UE (e.g., using communication manager 140 and/or reception component 1302, depicted in FIG. 13) may receive an indication that a first set of HARQ process identifiers is reserved for a first periodic communication configuration, as described above in connection with FIGS. 6-8.

As further shown in FIG. 11, in some aspects, process 1100 may include performing a retransmission of a communication, in accordance with a second periodic communication configuration, using a second set of HARQ process identifiers that does not overlap with the first set of HARQ process identifiers (block 1120). For example, the UE (e.g., using communication manager 140 and/or transmission component 1304, depicted in FIG. 13) may perform a retransmission of a communication, in accordance with a second periodic communication configuration, using a second set of HARQ process identifiers that does not overlap with the first set of HARQ process identifiers, as described above in connection with FIGS. 6-8.

Process 1100 may include additional aspects, such as any single aspect or any combination of aspects described below and/or in connection with one or more other processes described elsewhere herein.

In a first aspect, the first periodic communication configuration and the second periodic communication configuration are semi-persistent scheduling configurations.

In a second aspect, alone or in combination with the first aspect, the first periodic communication configuration and the second periodic communication configuration are configured grant configurations.

In a third aspect, alone or in combination with one or more of the first and second aspects, the first periodic communication configuration is a configured grant type 1 configuration and the second periodic communication configuration is a configured grant type 2 configuration.

In a fourth aspect, alone or in combination with one or more of the first through third aspects, the first set of HARQ process identifiers and the second set of HARQ process identifiers are HARQ feedback enabled identifiers, or the first set of HARQ process identifiers and the second set of HARQ process identifiers are HARQ feedback disabled identifiers.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
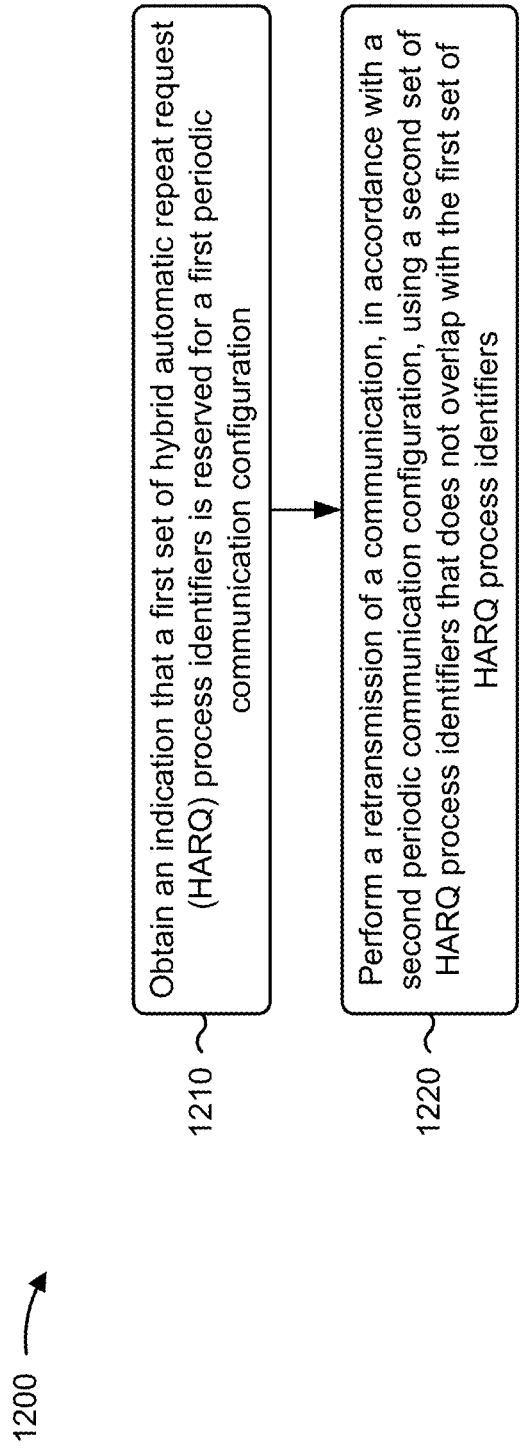
FIG. 12 is a diagram illustrating an example process associated with transmission in configured grant and SPS in a non-terrestrial network, in accordance with the present disclosure.

FIG. 12 is a diagram illustrating an example process 1200 performed, for example, by a network node, in accordance with the present disclosure. Example process 1200 is an example where the network node (e.g., network node 110) performs operations associated with transmission in configured grant and SPS in non-terrestrial network.

As shown in FIG. 12, in some aspects, process 1200 may include obtaining an indication that a first set of HARQ process identifiers is reserved for a first periodic communication configuration (block 1210). For example, the network node (e.g., using communication manager 150 and/or reception component 1402, depicted in FIG. 14) may obtain an indication that a first set of HARQ process identifiers is reserved for a first periodic communication configuration, as described above in connection with FIGS. 6-8.

As further shown in FIG. 12, in some aspects, process 1200 may include performing a retransmission of a communication, in accordance with a second periodic communication configuration, using a second set of HARQ process identifiers that does not overlap with the first set of HARQ process identifiers (block 1220). For example, the network node (e.g., using communication manager 150 and/or transmission component 1404, depicted in FIG. 14) may perform a retransmission of a communication, in accordance with a second periodic communication configuration, using a second set of HARQ process identifiers that does not overlap with the first set of HARQ process identifiers, as described above in connection with FIGS. 6-8.

Process 1200 may include additional aspects, such as any single aspect or any combination of aspects described below and/or in connection with one or more other processes described elsewhere herein.

In a first aspect, the first periodic communication configuration and the second periodic communication configuration are semi-persistent scheduling configurations.

In a second aspect, alone or in combination with the first aspect, the first periodic communication configuration and the second periodic communication configuration are configured grant configurations.

In a third aspect, alone or in combination with one or more of the first and second aspects, the first periodic communication configuration is a configured grant type 1 configuration and the second periodic communication configuration is a configured grant type 2 configuration.

In a fourth aspect, alone or in combination with one or more of the first through third aspects, the first set of HARQ process identifiers and the second set of HARQ process identifiers are HARQ feedback enabled identifiers, or the first set of HARQ process identifiers and the second set of HARQ process identifiers are HARQ feedback disabled identifiers.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
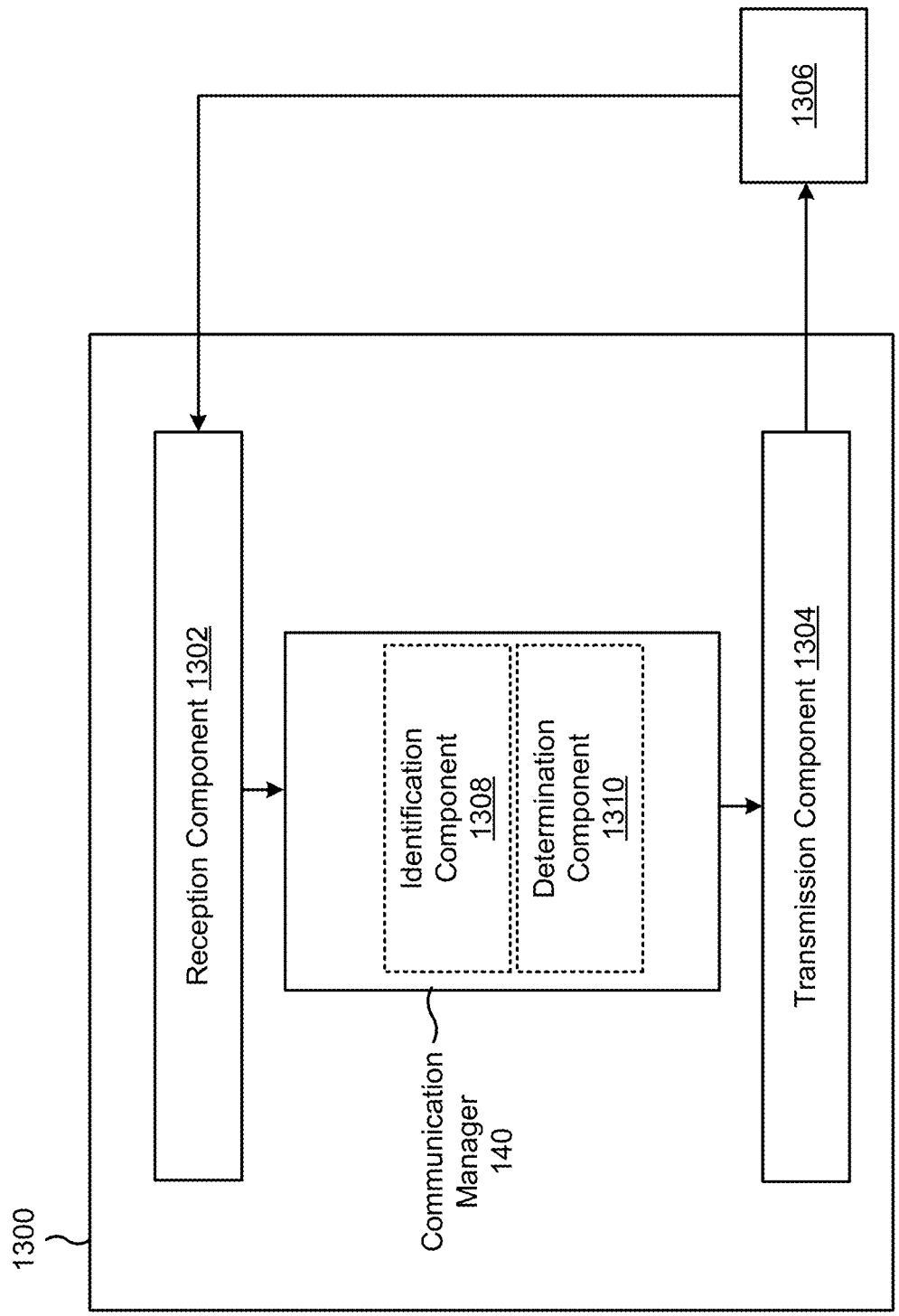
FIG. 13 is a diagram of an example apparatus for wireless communication, in accordance with the present disclosure.

FIG. 13 is a diagram of an example apparatus 1300 for wireless communication. The apparatus 1300 may be a UE, or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a network node, or another wireless communication device) using the reception component 1302 and the transmission component 1304. As further shown, the apparatus 1300 may include the communication manager 140. The communication manager 140 may include one or more of an identification component 1308 or a determination component 1310, among other examples.

In some aspects, the apparatus 1300 may be configured to perform one or more operations described herein in connection with FIGS. 6-8. Additionally, or alternatively, the apparatus 1300 may be configured to perform one or more processes described herein, such as process 900 of FIG. 9, process 1100 of FIG. 11, or a combination thereof. In some aspects, the apparatus 1300 and/or one or more components shown in FIG. 13 may include one or more components of the UE described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the UE described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the UE described in connection with FIG. 2. In some aspects, the transmission component 1304 may be co-located with the reception component 1302 in a transceiver.

The reception component 1302 may receive an indication to transmit a communication associated with a configured grant in an NTN, the indication indicating a HARQ process identifier and a configured grant index of the communication. The transmission component 1304 may perform a transmission of the communication based at least in part on the HARQ process identifier and the configured grant index.

The identification component 1308 may identify the configured grant index based at least in part on information indicated in the indication to transmit the communication.

The reception component 1302 may receive information indicating one or more timers associated with the HARQ process identifier, wherein each timer of the one or more timers is associated with a different configured grant index.

The transmission component 1304 may perform the transmission of the communication using the first timer.

The transmission component 1304 may perform a transmission of a second communication, associated with the HARQ process identifier and the second configured grant index, using the second timer.

The determination component 1310 may determine that a next transmission of the communication is associated with the first timer.

The transmission component 1304 may skip the next transmission of the communication based at least in part on determining that the first timer is running The determination component 1310 may determine that a transmission of a next communication is associated with the first timer.

The transmission component 1304 may perform the transmission of the next communication using a timer that is not associated with the configured grant.

The transmission component 1304 may perform a transmission of a second communication, wherein the transmission of the communication includes the configured grant index and the transmission of the second communication includes a second configured grant index.

The reception component 1302 may receive an indication that a first set of HARQ process identifiers is reserved for a first periodic communication configuration. The transmission component 1304 may perform a retransmission of a communication, in accordance with a second periodic communication configuration, using a second set of HARQ process identifiers that does not overlap with the first set of HARQ process identifiers.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
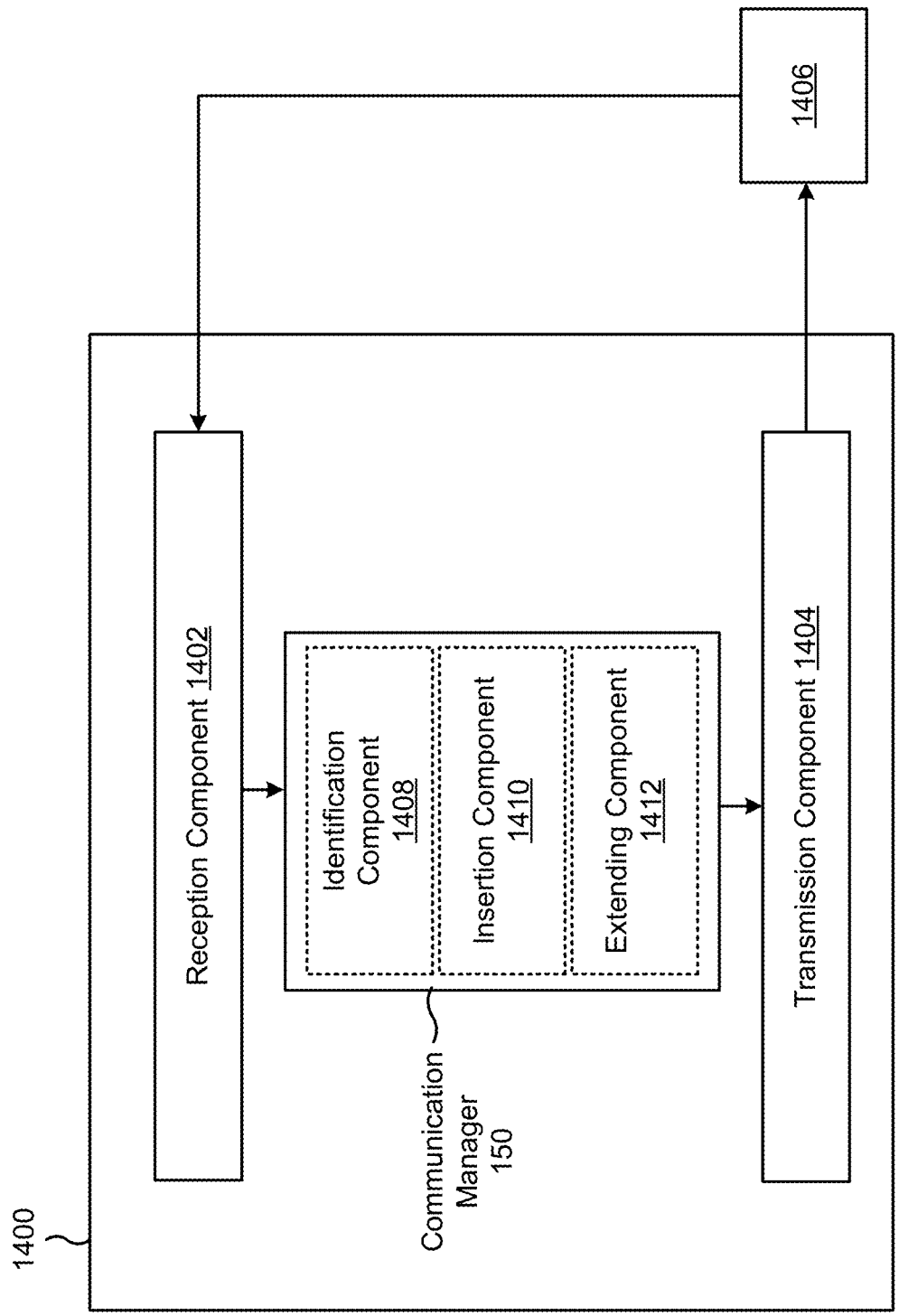
FIG. 14 is a diagram of an example apparatus for wireless communication, in accordance with the present disclosure.

FIG. 14 is a diagram of an example apparatus 1400 for wireless communication. The apparatus 1400 may be a network node, or a network node may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a network node, or another wireless communication device) using the reception component 1402 and the transmission component 1404. As further shown, the apparatus 1400 may include the communication manager 150. The communication manager 150 may include one or more of an identification component 1408, an insertion component 1410, or an extending component 1412, among other examples.

In some aspects, the apparatus 1400 may be configured to perform one or more operations described herein in connection with FIGS. 6-8. Additionally, or alternatively, the apparatus 1400 may be configured to perform one or more processes described herein, such as process 1000 of FIG. 10, process 1200 of FIG. 12, or a combination thereof. In some aspects, the apparatus 1400 and/or one or more components shown in FIG. 14 may include one or more components of the network node described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the network node described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the network node described in connection with FIG. 2. In some aspects, the transmission component 1404 may be co-located with the reception component 1402 in a transceiver.

The transmission component 1404 may transmit an indication for a UE to monitor for a communication associated with an SPS configuration in an NTN, the indication indicating a HARQ feedback identifier and an SPS index of the communication. The transmission component 1404 may perform a transmission of the communication that includes the HARQ feedback identifier and the SPS index.

The identification component 1408 may identify the SPS index based at least in part on information indicated in the indication for the UE to monitor for the communication.

The insertion component 1410 may include the SPS index in one or more bits of the DCI that is reserved for physical uplink control channel or feedback timing indicators.

The extending component 1412 may extend the DCI to include one or more bits that indicate the SPS index.

The transmission component 1404 may perform a transmission of a second communication, wherein the transmission of the communication includes the SPS index and the transmission of the second communication includes a second SPS index.

The insertion component 1410 may include the SPS index in a single bit of downlink control information that is reserved for an uplink shared channel indicator or a physical uplink control channel indicator.

The insertion component 1410 may include the SPS index in a single bit of added downlink control information that uses a format associated with an NTN.

The reception component 1402 may obtain an indication that a first set of HARQ process identifiers is reserved for a first periodic communication configuration. The transmission component 1404 may perform a retransmission of a communication, in accordance with a second periodic communication configuration, using a second set of HARQ process identifiers that does not overlap with the first set of HARQ process identifiers.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a user equipment (UE), comprising: receiving an indication to transmit a communication associated with a configured grant in a non-terrestrial network (NTN), the indication indicating a hybrid automatic repeat request (HARQ) process identifier and a configured grant index of the communication; and performing a transmission of the communication based at least in part on the HARQ process identifier and the configured grant index.

Aspect 2: The method of Aspect 1, further comprising identifying the configured grant index based at least in part on information indicated in the indication to transmit the communication.

Aspect 3: The method of any of Aspects 1-2, wherein receiving the indication includes receiving the indication via downlink control information (DCI).

Aspect 4: The method of Aspect 3, wherein the configured grant index is indicated in a portion of the DCI that is reserved for physical uplink shared channel scheduling.

Aspect 5: The method of Aspect 3, wherein the DCI is extended to include one or more bits that indicate the configured grant index.

Aspect 6: The method of any of Aspects 1-5, wherein a radio network temporary identifier of the indication is specific to the configured grant index.

Aspect 7: The method of any of Aspects 1-6, wherein a search space of a physical downlink control channel in which the indication is received is specific to the configured grant index.

Aspect 8: The method of any of Aspects 1-7, wherein the indication indicates to transmit the communication using a HARQ process identifier of a first ongoing HARQ process in the configured grant or a HARQ process identifier of a last ongoing HARQ process in the configured grant.

Aspect 9: The method of any of Aspects 1-8, further comprising receiving information indicating one or more timers associated with the HARQ process identifier, wherein each timer of the one or more timers is associated with a different configured grant index.

Aspect 10: The method of Aspect 9, wherein the one or more timers include a first timer that is associated with the HARQ process identifier and the configured grant index, and a second timer that is associated with the HARQ process identifier and a second configured grant index.

Aspect 11: The method of Aspect 10, further comprising: performing the transmission of the communication using the first timer; and performing a transmission of a second communication, associated with the HARQ process identifier and the second configured grant index, using the second timer.

Aspect 12: The method of Aspect 11, wherein performing the transmission of the second communication comprises: performing the transmission of the second communication, using the second timer, while the first timer is running Aspect 13: The method of Aspect 11, wherein the transmission of the second communication is a retransmission of the communication.

Aspect 14: The method of Aspect 11, wherein the transmission of the second communication is a communication of a different communication than the communication.

Aspect 15: The method of Aspect 10, further comprising: determining that a next transmission of the communication is associated with the first timer; and skipping the next transmission of the communication based at least in part on determining that the first timer is running Aspect 16: The method of Aspect 10, further comprising: determining that a transmission of a next communication is associated with the first timer; and performing the transmission of the next communication using a timer that is not associated with the configured grant.

Aspect 17: The method of Aspect 16, wherein the timer that is not associated with the configured grant includes a discontinuous reception timer.

Aspect 18: The method of Aspect 1, wherein the configured grant index includes a first state indicating that the HARQ process is enabled or a second state indicating that the HARQ process is disabled.

Aspect 19: The method of any of Aspects 1-18, further comprising performing a transmission of a second communication, wherein the transmission of the communication includes the configured grant index and the transmission of the second communication includes a second configured grant index.

Aspect 20: The method of Aspect 19, wherein a scheduling of the transmission of the communication is received during a run time of a first configured grant timer, and a scheduling of the transmission of the second communication is received during a run time of a second configured grant timer, wherein the run time of the first configured grant timer at least partially overlaps with the run time of the second configured grant timer.

Aspect 21: The method of Aspect 18, wherein the configured grant index is indicated in a single bit of downlink control information (DCI) that was previously associated with an uplink shared channel indicator or a physical uplink control channel indicator.

Aspect 22: The method of Aspect 18, wherein the configured grant index is indicated in a single bit of downlink control information (DCI) that uses a format associated with a non-terrestrial network (NTN).

Aspect 23: The method of any of Aspects 1-22, wherein the indication to transmit the communication is an indication to retransmit the communication, and wherein performing the transmission of the communication includes performing a retransmission of the communication.

Aspect 24: A method of wireless communication performed by a network node, comprising: transmitting an indication for a user equipment (UE) to monitor for a communication associated with a semi-persistent scheduling (SPS) configuration in a non-terrestrial network (NTN), the indication indicating a hybrid automatic repeat request (HARQ) feedback identifier and an SPS index of the communication; and performing a transmission of the communication that includes the HARQ feedback identifier and the SPS index.

Aspect 25: The method of Aspect 24, further comprising identifying the SPS index based at least in part on information indicated in the indication for the UE to monitor for the communication.

Aspect 26: The method of any of Aspects 24-25, wherein transmitting the indication includes transmitting the indication via downlink control information (DCI).

Aspect 27: The method of Aspect 26, further comprising including the SPS index in one or more bits of the DCI that is reserved for physical uplink control channel or feedback timing indicators.

Aspect 28: The method of Aspect 26, further comprising extending the DCI to include one or more bits that indicate the SPS index.

Aspect 29: The method of any of Aspects 24-28, wherein transmitting the indication includes transmitting a radio network temporary identifier of the indication that is specific to the SPS index.

Aspect 30: The method of any of Aspects 24-29, wherein transmitting the indication includes transmitting the indication in a physical downlink control channel having a search space that is specific to the SPS index.

Aspect 31: The method of any of Aspects 24-30, wherein the indication indicates to monitor for the communication having one of a HARQ feedback identifier of a first ongoing HARQ feedback in the SPS configuration or a HARQ feedback identifier of a last ongoing HARQ feedback in the SPS configuration.

Aspect 32: The method of any of Aspects 24-31, wherein the SPS index includes a first state indicating that the HARQ feedback is enabled or a second state indicating that the HARQ feedback is disabled.

Aspect 33: The method of any of Aspects 24-32, further comprising performing a transmission of a second communication, wherein the transmission of the communication includes the SPS index and the transmission of the second communication includes a second SPS index.

Aspect 34: The method of Aspect 32, further comprising including the SPS index in a single bit of downlink control information that is reserved for an uplink shared channel indicator or a physical uplink control channel indicator.

Aspect 35: The method of Aspect 32, further comprising including the SPS index in a single bit of added downlink control information that uses a format associated with a non-terrestrial network (NTN).

Aspect 36: The method of any of Aspects 24-35, wherein the indication to monitor for the communication is an indication to monitor for a retransmission of the communication.

Aspect 37: A method of wireless communication performed by a user equipment (UE), comprising: receiving an indication that a first set of hybrid automatic repeat request (HARQ) process identifiers is reserved for a first periodic communication configuration; and performing a retransmission of a communication, in accordance with a second periodic communication configuration, using a second set of HARQ process identifiers that does not overlap with the first set of HARQ process identifiers.

Aspect 38: The method of Aspect 37, wherein the first periodic communication configuration and the second periodic communication configuration are semi-persistent scheduling configurations.

Aspect 39: The method of Aspect 37, wherein the first periodic communication configuration and the second periodic communication configuration are configured grant configurations.

Aspect 40: The method of Aspect 37, wherein the first periodic communication configuration is a configured grant type 1 configuration and the second periodic communication configuration is a configured grant type 2 configuration.

Aspect 41: The method of any of Aspects 37-40, wherein the first set of HARQ process identifiers and the second set of HARQ process identifiers are HARQ feedback enabled identifiers, or the first set of HARQ process identifiers and the second set of HARQ process identifiers are HARQ feedback disabled identifiers.

Aspect 42: A method of wireless communication performed by a network node, comprising: obtaining an indication that a first set of hybrid automatic repeat request (HARQ) process identifiers is reserved for a first periodic communication configuration; and performing a retransmission of a communication, in accordance with a second periodic communication configuration, using a second set of HARQ process identifiers that does not overlap with the first set of HARQ process identifiers.

Aspect 43: The method of Aspect 42, wherein the first periodic communication configuration and the second periodic communication configuration are semi-persistent scheduling configurations.

Aspect 44: The method of Aspect 42, wherein the first periodic communication configuration and the second periodic communication configuration are configured grant configurations.

Aspect 45: The method of Aspect 42, wherein the first periodic communication configuration is a configured grant type 1 configuration and the second periodic communication configuration is a configured grant type 2 configuration.

Aspect 46: The method of any of Aspects 42-46, wherein the first set of HARQ process identifiers and the second set of HARQ process identifiers are HARQ feedback enabled identifiers, or the first set of HARQ process identifiers and the second set of HARQ process identifiers are HARQ feedback disabled identifiers.

Aspect 47: A method of wireless communication performed by a user equipment (UE), comprising: receiving an indication to monitor for a communication associated with a semi-persistent scheduling (SPS) configuration in a non-terrestrial network (NTN), the indication indicating a hybrid automatic repeat request (HARQ) process identifier and an SPS index of the communication; and receiving the communication based at least in part on the HARQ process identifier and the SPS index.

Aspect 48: The method of Aspect 47, further comprising identifying the SPS index based at least in part on information indicated in the indication to monitor for the communication.

Aspect 49: The method of any of Aspects 47-48, wherein receiving the indication includes receiving the indication via downlink control information (DCI).

Aspect 50: The method of Aspect 49, wherein the SPS index is indicated in a portion of the DCI that is reserved for physical uplink shared channel scheduling.

Aspect 51: The method of Aspect 49, wherein the DCI is extended to include one or more bits that indicate the SPS index.

Aspect 52: The method of any of Aspects 47-51, wherein a radio network temporary identifier of the indication is specific to the SPS configuration.

Aspect 53: The method of any of Aspects 47-52, wherein a search space of a physical downlink control channel in which the indication is received is specific to the SPS configuration.

Aspect 54: The method of any of Aspects 47-53, wherein the SPS index includes a first state indicating that the HARQ process is enabled or a second state indicating that the HARQ process is disabled.

Aspect 55: The method of Aspect 54, wherein the SPS index is indicated in a single bit of downlink control information (DCI) that was previously associated with an uplink shared channel indicator or a physical uplink control channel indicator.

Aspect 56: The method of Aspect 54, wherein the SPS index is indicated in a single bit of downlink control information (DCI) that uses a format associated with a non-terrestrial network (NTN).

Aspect 57: An apparatus for wireless communication at a device, comprising a processor; memory coupled with the processor; and instructions stored in the memory and executable by the processor to cause the apparatus to perform the method of one or more of Aspects 1-23.

Aspect 58: A device for wireless communication, comprising a memory and one or more processors coupled to the memory, the one or more processors configured to perform the method of one or more of Aspects 1-23.

Aspect 59: An apparatus for wireless communication, comprising at least one means for performing the method of one or more of Aspects 1-23.

Aspect 60: A non-transitory computer-readable medium storing code for wireless communication, the code comprising instructions executable by a processor to perform the method of one or more of Aspects 1-23.

Aspect 61: A non-transitory computer-readable medium storing a set of instructions for wireless communication, the set of instructions comprising one or more instructions that, when executed by one or more processors of a device, cause the device to perform the method of one or more of Aspects 1-23.

Aspect 62: An apparatus for wireless communication at a device, comprising a processor; memory coupled with the processor; and instructions stored in the memory and executable by the processor to cause the apparatus to perform the method of one or more of Aspects 24-35.

Aspect 63: A device for wireless communication, comprising a memory and one or more processors coupled to the memory, the one or more processors configured to perform the method of one or more of Aspects 24-35.

Aspect 64: An apparatus for wireless communication, comprising at least one means for performing the method of one or more of Aspects 24-35.

Aspect 65: A non-transitory computer-readable medium storing code for wireless communication, the code comprising instructions executable by a processor to perform the method of one or more of Aspects 24-35.

Aspect 66: A non-transitory computer-readable medium storing a set of instructions for wireless communication, the set of instructions comprising one or more instructions that, when executed by one or more processors of a device, cause the device to perform the method of one or more of Aspects 24-35.

Aspect 67: An apparatus for wireless communication at a device, comprising a processor; memory coupled with the processor; and instructions stored in the memory and executable by the processor to cause the apparatus to perform the method of one or more of Aspects 37-41.

Aspect 68: A device for wireless communication, comprising a memory and one or more processors coupled to the memory, the one or more processors configured to perform the method of one or more of Aspects 37-41.

Aspect 69: An apparatus for wireless communication, comprising at least one means for performing the method of one or more of Aspects 37-41.

Aspect 70: A non-transitory computer-readable medium storing code for wireless communication, the code comprising instructions executable by a processor to perform the method of one or more of Aspects 37-41.

Aspect 71: A non-transitory computer-readable medium storing a set of instructions for wireless communication, the set of instructions comprising one or more instructions that, when executed by one or more processors of a device, cause the device to perform the method of one or more of Aspects 37-41.

Aspect 72: An apparatus for wireless communication at a device, comprising a processor; memory coupled with the processor; and instructions stored in the memory and executable by the processor to cause the apparatus to perform the method of one or more of Aspects 42-46.

Aspect 73: A device for wireless communication, comprising a memory and one or more processors coupled to the memory, the one or more processors configured to perform the method of one or more of Aspects 42-46.

Aspect 74: An apparatus for wireless communication, comprising at least one means for performing the method of one or more of Aspects 42-46.

Aspect 75: A non-transitory computer-readable medium storing code for wireless communication, the code comprising instructions executable by a processor to perform the method of one or more of Aspects 42-46.

Aspect 76: A non-transitory computer-readable medium storing a set of instructions for wireless communication, the set of instructions comprising one or more instructions that, when executed by one or more processors of a device, cause the device to perform the method of one or more of Aspects 42-46.

Aspect 77: An apparatus for wireless communication at a device, comprising a processor; memory coupled with the processor; and instructions stored in the memory and executable by the processor to cause the apparatus to perform the method of one or more of Aspects 47-56.

Aspect 78: A device for wireless communication, comprising a memory and one or more processors coupled to the memory, the one or more processors configured to perform the method of one or more of Aspects 47-56.

Aspect 79: An apparatus for wireless communication, comprising at least one means for performing the method of one or more of Aspects 47-56.

Aspect 80: A non-transitory computer-readable medium storing code for wireless communication, the code comprising instructions executable by a processor to perform the method of one or more of Aspects 47-56.

Aspect 81: A non-transitory computer-readable medium storing a set of instructions for wireless communication, the set of instructions comprising one or more instructions that, when executed by one or more processors of a device, cause the device to perform the method of one or more of Aspects 47-56.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   memory; and
   one or more processors, coupled to the memory, configured to:
      receive, via downlink control information (DCI), an indication to retransmit a communication associated with a configured grant in a non-terrestrial network (NTN), the indication indicating a hybrid automatic repeat request (HARQ) process identifier and a configured grant index of the communication; and
      perform the retransmission of the communication based at least in part on the HARQ process identifier and the configured grant index.

2. The apparatus of claim 1, wherein the one or more processors are further configured to identify the configured grant index based at least in part on information indicated in the indication to retransmit the communication.

3. The apparatus of claim 1, wherein the configured grant index is indicated in a portion of the DCI that is reserved for physical uplink shared channel scheduling.

4. The apparatus of claim 1, wherein a radio network temporary identifier of the indication is specific to the configured grant index.

5. The apparatus of claim 1, wherein the indication indicates to retransmit the communication using a HARQ process identifier of a first ongoing HARQ process in the configured grant or a HARQ process identifier of a last ongoing HARQ process in the configured grant.

6. The apparatus of claim 1, wherein the one or more processors are further configured to receive information indicating one or more timers associated with the HARQ process identifier, wherein each timer of the one or more timers is associated with a different configured grant index.

7. The apparatus of claim 6, wherein the one or more timers include a first timer that is associated with the HARQ process identifier and the configured grant index, and a second timer that is associated with the HARQ process identifier and a second configured grant index.

8. The apparatus of claim 7, wherein, to perform the retransmission of the communication, the one or more processors are configured to:
   perform the retransmission of the communication using the first timer, and
   wherein the one or more processors are further configured to:
      perform a transmission of a second communication, associated with the HARQ process identifier and the second configured grant index, using the second timer.

9. The apparatus of claim 8, wherein the one or more processors, to perform the transmission of the second communication, are configured to:
   perform the transmission of the second communication, using the second timer, while the first timer is running.

10. The apparatus of claim 7, wherein the one or more processors are further configured to:
    determine that a next transmission of the communication is associated with the first timer; and
    skip the next transmission of the communication based at least in part on determining that the first timer is running.

11. The apparatus of claim 7, wherein the one or more processors are further configured to:
    determine that a transmission of a next communication is associated with the first timer; and
    perform the transmission of the next communication using a timer that is not associated with the configured grant.

12. The apparatus of claim 1, wherein the configured grant index includes a first state indicating that the HARQ process is enabled or a second state indicating that the HARQ process is disabled.

13. The apparatus of claim 1, wherein the one or more processors are further configured to perform a transmission of a second communication, wherein the transmission of the communication includes the configured grant index and the transmission of the second communication includes a second configured grant index, and wherein the communication and the second communication have same HARQ process identifier.

14. The apparatus of claim 13, wherein a scheduling of the transmission of the communication is received during a run time of a first configured grant timer, and a scheduling of the transmission of the second communication is received during a run time of a second configured grant timer, wherein the run time of the first configured grant timer at least partially overlaps with the run time of the second configured grant timer.

15. The apparatus of claim 1, wherein the DCI comprises a DCI format 0_1 or a DCI format 1_1.

16. The apparatus of claim 10, wherein the one or more processors are further configured to:

determine, based at least in part on determining that the next transmission of the communication is associated with the first timer, that the first timer is still running.

17. An apparatus for wireless communication at a network node, comprising:
  memory; and
  one or more processors, coupled to the memory, configured to:
    transmit, via downlink control information (DCI), an indication for a user equipment (UE) to monitor for a retransmission of a communication associated with a semi-persistent scheduling (SPS) configuration in a non-terrestrial network (NTN), the indication indicating a hybrid automatic repeat request (HARQ) feedback identifier and an SPS index of the communication; and
    perform the retransmission of the communication that includes the HARQ feedback identifier and the SPS index.

18. The apparatus of claim 17, wherein the one or more processors are further configured to identify the SPS index based at least in part on information indicated in the indication for the UE to monitor for the communication.

19. The apparatus of claim 17, wherein the one or more processors are further configured to include the SPS index in one or more bits of the DCI that is reserved for physical uplink control channel or feedback timing indicators.

20. The apparatus of claim 19, wherein the one or more processors, to transmit the indication, are configured to transmit a radio network temporary identifier of the indication that is specific to the SPS index.

21. The apparatus of claim 17, wherein the indication indicates to monitor for the communication having one of a HARQ feedback identifier of a first ongoing HARQ feedback in the SPS configuration or a HARQ feedback identifier of a last ongoing HARQ feedback in the SPS configuration.

22. The apparatus of claim 17, wherein the SPS index includes a first state indicating that the HARQ feedback is enabled or a second state indicating that the HARQ feedback is disabled.

23. The apparatus of claim 17, wherein the one or more processors are further configured to perform a transmission of a second communication, wherein the retransmission of the communication includes the SPS index and the transmission of the second communication includes a second SPS index.

24. An apparatus for wireless communication at a user equipment (UE), comprising:
  memory; and
  one or more processors, coupled to the memory, configured to:
    receive an indication that a first set of hybrid automatic repeat request (HARQ) process identifiers is reserved for a first periodic communication configuration, wherein the indication further indicates an offset to be applied for a retransmission of a communication; and
    perform a retransmission of a communication, based at least in part on the offset and in accordance with a second periodic communication configuration, using a second set of HARQ process identifiers that does not overlap with the first set of HARQ process identifiers.

25. The apparatus of claim 24, wherein the first periodic communication configuration and the second periodic communication configuration are semi-persistent scheduling configurations.

26. The apparatus of claim 24, wherein the first periodic communication configuration and the second periodic communication configuration are configured grant configurations.

27. The apparatus of claim 24, wherein the first set of HARQ process identifiers are HARQ feedback enabled identifiers, and the second set of HARQ process identifiers are HARQ feedback disabled identifiers.

28. An apparatus for wireless communication at a user equipment (UE), comprising:
  memory; and
  one or more processors, coupled to the memory, configured to:
    receive, via downlink control information (DCI), an indication to monitor for a retransmission of a communication associated with a semi-persistent scheduling (SPS) configuration in a non-terrestrial network (NTN), the indication indicating a hybrid automatic repeat request (HARQ) process identifier and an SPS index of the communication; and
    receive the retransmission of the communication based at least in part on the HARQ process identifier and the SPS index.

29. The apparatus of claim 28, wherein the one or more processors are further configured to identify the SPS index based at least in part on information indicated in the indication to monitor for the communication.

30. The apparatus of claim 28, wherein:
  the SPS index is indicated in a portion of the DCI that is reserved for physical uplink shared channel scheduling; or
  the DCI is extended to include one or more bits that indicate the SPS index.

* * * * *